United States Patent
Kyono et al.

(10) Patent No.: US 11,052,315 B2
(45) Date of Patent: Jul. 6, 2021

(54) IMAGE GENERATION SYSTEM AND INFORMATION STORAGE MEDIUM

(71) Applicant: BANDAI NAMCO ENTERTAINMENT INC., Tokyo (JP)

(72) Inventors: Akihiro Kyono, Niiza (JP); Ken Masumori, Tokyo (JP)

(73) Assignee: BANDAI NAMCO ENTERTAINMENT INC., Tokyo (JP)

( * ) Notice: Subject to any disclaimer, the term of this patent is extended or adjusted under 35 U.S.C. 154(b) by 0 days.

(21) Appl. No.: 16/123,752

(22) Filed: Sep. 6, 2018

(65) Prior Publication Data
US 2019/0076738 A1 Mar. 14, 2019

(30) Foreign Application Priority Data
Sep. 12, 2017 (JP) .............................. JP2017-174831

(51) Int. Cl.
*A63F 13/52* (2014.01)
*A63F 13/35* (2014.01)
(Continued)

(52) U.S. Cl.
CPC .......... *A63F 13/52* (2014.09); *A63F 13/2145* (2014.09); *A63F 13/35* (2014.09);
(Continued)

(58) Field of Classification Search
CPC .......... A63F 13/45; A63F 13/47; A63F 13/52; A63F 13/525; A63F 13/5252;
(Continued)

(56) References Cited

U.S. PATENT DOCUMENTS 5,358,259 A * 10/1994 Best ...................... A63F 13/005
463/31
5,393,071 A * 2/1995 Best ...................... A63F 13/005
463/35

(Continued)

FOREIGN PATENT DOCUMENTS

JP          08063613 A  *  3/1996
JP          4117343 B2     7/2008

*Primary Examiner* — Steven J Hylinski
(74) *Attorney, Agent, or Firm* — Oliff PLC

(57) ABSTRACT

Image generation system which provides, to a plurality of players through individual terminals, image of a game which progresses through cooperation of plurality of individually manipulated characters, image generation system including: game image generating means that generates image of game space in which the plurality of manipulated characters act, as game screen directed at the plurality of players; and determining means that determines if a game event that occurs based on manipulation information input by the plurality of players or the manipulation information fulfills given conditions, game image generating means including insert image generating means that generates, when the given conditions are fulfilled, two or more images related to manipulated characters of cooperating players having cooperated with the fulfillment, insert images to be inserted into (Continued)

game screens of cooperating players, and the insert image generating means generating the insert images respectively directed at cooperating players in accordance with manipulated characters.

14 Claims, 13 Drawing Sheets

(51) Int. Cl.
    *A63F 13/847* (2014.01)
    *A63F 13/44* (2014.01)
    *A63F 13/833* (2014.01)
    *A63F 13/533* (2014.01)
    *A63F 13/795* (2014.01)
    *A63F 13/2145* (2014.01)
    *A63F 13/537* (2014.01)

(52) U.S. Cl.
    CPC ............ *A63F 13/44* (2014.09); *A63F 13/533* (2014.09); *A63F 13/537* (2014.09); *A63F 13/795* (2014.09); *A63F 13/833* (2014.09); *A63F 13/847* (2014.09)

(58) Field of Classification Search
    CPC .. A63F 13/5255; A63F 13/53; A63F 13/5378; A63F 13/822; A63F 2300/807
    See application file for complete search history.

(56) References Cited

U.S. PATENT DOCUMENTS

| | | | | |
|---|---|---|---|---|
| 7,033,275 | B1* | 4/2006 | Endo | A63F 13/10 463/33 |
| 9,579,563 | B2* | 2/2017 | Shinoda | A63F 13/803 |
| 2003/0190940 | A1* | 10/2003 | Gordon | A63F 13/005 463/9 |
| 2004/0259617 | A1* | 12/2004 | Machida | A63F 13/10 463/5 |
| 2004/0259644 | A1* | 12/2004 | McCauley | A63F 13/04 463/51 |
| 2006/0116186 | A1* | 6/2006 | Sawada | A63F 13/10 463/4 |
| 2006/0183521 | A1* | 8/2006 | Hamamoto | A63F 13/10 463/8 |
| 2007/0026944 | A1* | 2/2007 | Maehiro | A63F 13/10 463/31 |
| 2007/0149266 | A1* | 6/2007 | Arakawa | A63F 13/10 463/8 |
| 2007/0213107 | A1* | 9/2007 | Itou | A63F 13/00 463/1 |
| 2014/0221062 | A1* | 8/2014 | Shinoda | A63F 13/12 463/6 |
| 2018/0250593 | A1* | 9/2018 | Benedetto | A63F 13/47 |

* cited by examiner

| USER INFORMATION ||||| 146 |
|---|---|---|---|---|
| PLAYER ID | USABLE CHARACTERS | LEVEL | PLAYER IDS OF PLAYERS REGISTERED AS FRIENDS | MATCH-UP CURRENTLY PARTICIPATING IN |
| 001 | A | LV1 | 002, 003, 004 | 1ST MATCH-UP |
| 002 | A, B | LV2 | 001, 003, 004 | 1ST MATCH-UP |
| 003 | A, B, C | LV3 | 001, 002, 004 | 1ST MATCH-UP |
| 004 | A, B, C, D | LV4 | 001, 002, 003 | 1ST MATCH-UP |
| ⋮ | ⋮ | ⋮ | ⋮ | ⋮ |

FIG. 4

| GAME INFORMATION |||||| 144 ||
|---|---|---|---|---|---|---|---|
| MATCH-UP | PLAYER ID OF PARTICIPATING PLAYER | MANIPU-LATED CHARAC-TER | STAMI-NA LEVEL | DEADLY STRIKE PARAME-TER | COLLEC-TIVE STAMINA LEVEL | ENEMY CHARACTER ||
| | | | | | | STAMINA LEVEL | DEADLY STRIKE PARAME-TER |
| 1ST MATCH-UP | 001 | A | 6 | 7 | 7 | 6 | 7 |
| | 002 | B | 6 | 6 | | 6 | 6 |
| | 003 | C | 6 | 6 | | 6 | 6 |
| | 004 | D | 6 | 6 | | 6 | 6 |
| ⋮ | ⋮ | ⋮ | ⋮ | ⋮ | ⋮ | ⋮ | ⋮ |

FIG. 5

IMAGE GENERATION SYSTEM AND INFORMATION STORAGE MEDIUM

Japanese Patent Application No. 2017-174831, filed on Sep. 12, 2017, is hereby incorporated by reference in its entirety.

BACKGROUND OF THE INVENTION

The present invention relates to an image generation system and an information storage medium.

A cut-in is often used as a type of a screen presentation in a game. A cut-in refers to a screen presentation which involves interrupting a game scene at a given timing to insert a moving image of another scene or inserting a different image in a partial area of an image frame of a game. In particular, Japanese Patent No. 4117343 discloses a game apparatus which inserts a real-time cut-in of a combat situation of an ally group into a screen of a player during multiplayer game play.

However, the cut-in of the game apparatus described above is simply performed for the purpose of notifying the player of the combat situation of the player's ally group and does not serve to promote cooperation among individual players.

SUMMARY

The invention can provide an image generation system and others capable of promoting cooperation among individual players and energizing a game involving cooperative play by bestowing a sense of specialness to a player having cooperated with another player.

According to a first aspect of the invention, there is provided an image generation system which provides, to a plurality of players through terminals individually used by the plurality of players, an image of a game which progresses through cooperation of a plurality of manipulated characters individually manipulated by the plurality of players, the image generation system including:

game image generating means that generates an image of a game space in which the plurality of manipulated characters act, as a game screen directed at the plurality of players; and determining means that determines whether or not a game event that occurs based on manipulation information input by the plurality of players or the manipulation information fulfills given conditions, the game image generating means including insert image generating means that generates, when the given conditions are fulfilled, two or more images related to the manipulated characters of two or more cooperating players having cooperated with the fulfillment, as insert images to be inserted into game screens of at least the two or more cooperating players, and the insert image generating means generating the insert images respectively directed at the two or more cooperating players in accordance with the manipulated characters.

According to a second aspect of the invention, there is provided an image generation system which provides, to a plurality of players through terminals individually used by the plurality of players, an image of a game which progresses through cooperation of a plurality of manipulated characters individually manipulated by the plurality of players, the image generation system including:

game image generating means that generates an image of a game space in which the plurality of manipulated characters act, as a game screen directed at the plurality of players; and determining means that determines whether or not a game event that occurs based on manipulation information input by the plurality of players or the manipulation information fulfills given conditions, the game image generating means including insert image generating means that generates, when the given conditions are fulfilled, two or more images related to the manipulated characters of two or more cooperating players having cooperated with the fulfillment, as insert images to be inserted into game screens of at least the two or more cooperating players, and the game image generating means generating, when a part of the given conditions is fulfilled, images related to the manipulated characters of the two or more cooperating players having cooperated with the fulfillment of the part of the given conditions, as insert images to be inserted into at least a game screen of a player who can cooperate with fulfilling a remainder of the given conditions.

According to a third aspect of the invention, there is provided a non-transitory computer-readable information storage medium storing a program of an image generation system which provides, to a plurality of players through terminals individually used by the plurality of players, an image of a game which progresses through cooperation of a plurality of manipulated characters individually manipulated by the plurality of players, the program causing a computer to function as:

game image generating means that generates an image of a game space in which the plurality of manipulated characters act, as a game screen directed at the plurality of players; and determining means that determines whether or not a game event that occurs based on manipulation information input by the plurality of players or the manipulation information fulfills given conditions, the game image generating means including insert image generating means that generates, when the given conditions are fulfilled, two or more images related to the manipulated characters of two or more cooperating players having cooperated with the fulfillment, as insert images to be inserted into game screens of at least the two or more cooperating players, and the insert image generating means generating the insert images respectively directed at the two or more cooperating players in accordance with the manipulated characters.

BRIEF DESCRIPTION OF THE SEVERAL VIEWS OF THE DRAWING

FIG. 4 is a table illustrating an example of user information according to an embodiment of the invention.

FIG. 5 is a table illustrating an example of game information according to an embodiment of the invention.

Figure 1:
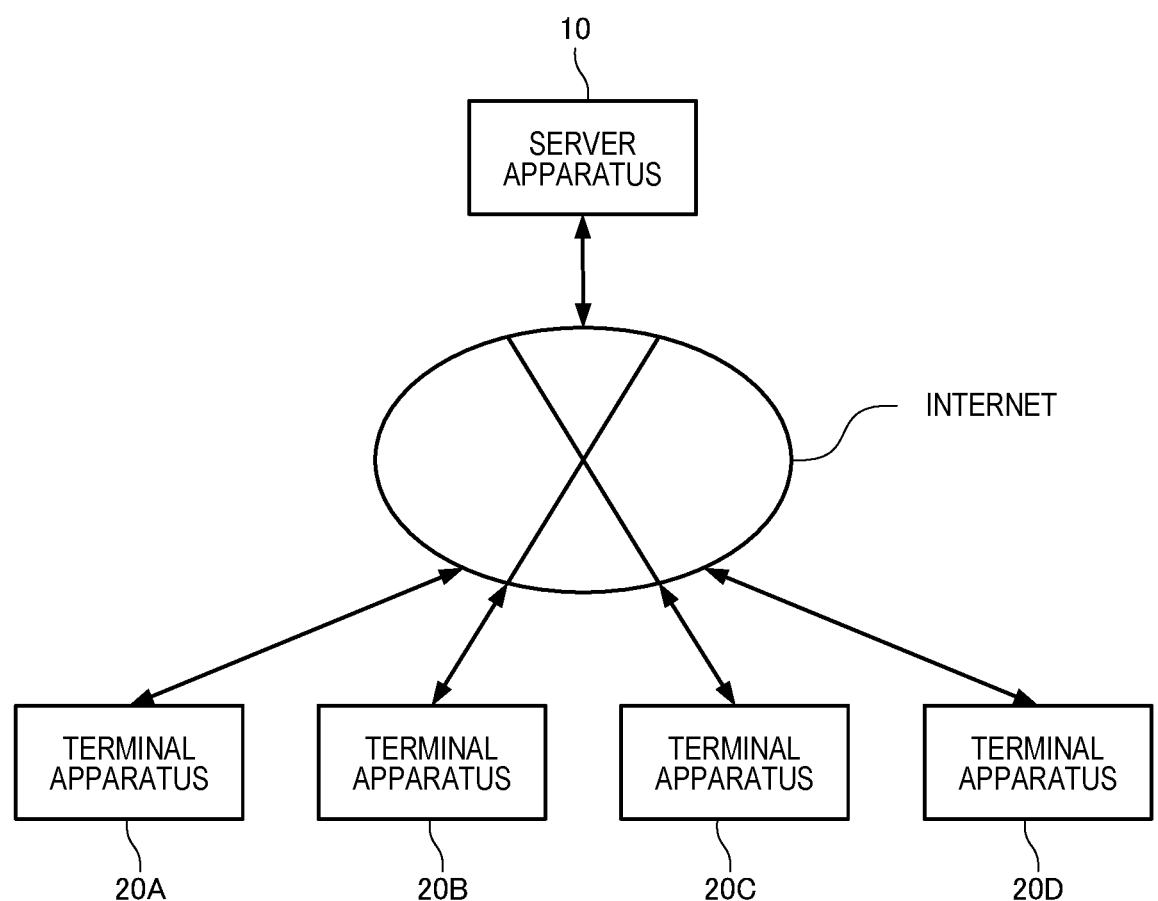
FIG. 1 is a diagram illustrating an example of a configuration of a game system according to an embodiment of the invention.

DETAILED DESCRIPTION OF THE EMBODIMENT (1) According to one embodiment of the invention, there is provided an image generation system which provides, to a plurality of players through terminals individually used by the plurality of players, an image of a game which progresses through cooperation of a plurality of manipulated characters individually manipulated by the plurality of players, the image generation system including:

game image generating means that generates an image of a game space in which the plurality of manipulated characters act, as a game screen directed at the plurality of players; and determining means that determines whether or not a game event that occurs based on manipulation information input by the plurality of players or the manipulation information fulfills given conditions, the game image generating means including insert image generating means that generates, when the given conditions are fulfilled, two or more images related to the manipulated characters of two or more cooperating players having cooperated with the fulfillment, as insert images to be inserted into game screens of at least the two or more cooperating players, and the insert image generating means generating the insert images respectively directed at the two or more cooperating players in accordance with the manipulated characters.

It should be noted that the "manipulation information" may include a manipulation command (which may also be referred to as an input command) which enables a manipulated character to execute a game event or the like.

In addition, the "game event" may include actions such as a manipulated character launching a deadly strike.

Furthermore, the "conditions" may include completion of input of a series of manipulation information within a time limit and an occurrence of a series of game events within a time limit.

In addition, the "game screen" may include a moving image (a video) of the game space and frame-by-frame images of the game space.

Furthermore, the "insert image" may include a still image inserted by temporarily suspending display of the game screen, a moving image inserted by temporarily suspending display of the game screen, a still image inserted in a partial area of the game screen, and a moving image inserted in a partial area of the game screen.

In addition, "generate in accordance with" may include setting at least a part of an insert image directed at a given cooperating player as an image (such as a close-up shot image) related to a manipulated character of the given cooperating player.

Furthermore, the "screen" may include a screen of a display apparatus that can be connected to a terminal in addition to a screen of a display apparatus provided in the terminal.

According to the embodiment described above, when given conditions are fulfilled with respect to a game event that occurs based on manipulation information or with respect to the manipulation information, an image related to manipulated characters of two or more cooperating player having cooperated with the fulfillment is inserted into a game screen of at least the two or more cooperating players. In addition, the insert image directed at each of the two or more cooperating players is generated in accordance with each manipulated character. Therefore, a cooperating player having cooperated with the fulfillment of conditions is provided with an insert image directed at himself/herself (an insert image exclusive for himself/herself or an insert image centered on himself/herself) as a reward for the cooperation. As a result, according to the embodiment described above, since a certain sense of specialness can be bestowed to a cooperating player, cooperation among individual players can be promoted and a game involving cooperative play can be energized.

(2) In the image generation system described above, the insert images are images in which related images of the manipulated characters of the two or more cooperating players are arranged in a screen, and the insert image generating means may generate the insert images respectively directed at the two or more cooperating players by adjusting a relationship of at least one of a layout, a display color, and a display size between the related images.

It should be noted that the "related images" may include a close-up shot image of a manipulated character.

In addition, the "display color" may include at least one of brightness, saturation, and hue.

According to the embodiment described above, the generation of an insert image directed at each of two or more cooperating players is performed by an adjustment of at least one of a layout, a display color, and a display size of related images in the insert image.

For example, the insert image generating means may generate an insert image directed at a given cooperating player so that a related image of a manipulated character of the cooperating player is arranged at a predetermined position such as head, center, or tail.

For example, the insert image generating means may generate an insert image directed at a given cooperating player so that a display color of a related image of a manipulated character of the cooperating player is more eye-catching than a display color of a related image of manipulated characters of other cooperating players.

For example, the insert image generating means may generate an insert image directed at a given cooperating player so that a display size of a related image of a manipulated character of the cooperating player is larger than a display size of a related image of manipulated characters of other cooperating players.

(3) In the image generation system described above, the insert images may be images in which related images of the manipulated characters of the two or more cooperating players are arranged in a time series, and the insert image generating means may generate the insert images respectively directed at the two or more cooperating players by adjusting a relationship of at least one of a display order, a display color, a display size, and a display time between the related images.

According to the embodiment described above, the generation of an insert image directed at each of two or more cooperating players is performed by an adjustment of at least one of a display order, a display color, a display size, and a display time of related images in the insert image.

For example, the insert image generating means may generate an insert image directed at a given cooperating player so that a related image of a manipulated character of the cooperating player is arranged in a predetermined order such as start, middle, or end.

For example, the insert image generating means may generate an insert image directed at a given cooperating player so that a display color of a related image of a manipulated character of the cooperating player is more eye-catching than a display color of a related image of manipulated characters of other cooperating players.

For example, the insert image generating means may generate an insert image directed at a given cooperating player so that a display size of a related image of a manipulated character of the cooperating player is larger than a display size of a related image of manipulated characters of other cooperating players.

For example, the insert image generating means may generate an insert image directed at a given cooperating player so that a display time of a related image of a manipulated character of the cooperating player is longer than a display time of a related image of manipulated characters of other cooperating players.

(4) In the image generation system described above, the given conditions may include a condition that input of a series of manipulation information is completed within a time limit.

According to the embodiment described above, since a time requirement is imposed to the fulfillment of the conditions, a sense of urgency can be imparted to a player about to cooperate with fulfilling the conditions.

(5) In the image generation system described above, the insert image generating means may generate an insert image directed at each of the two or more cooperating players based on a related image selected from a plurality of related images previously prepared for each of the plurality of manipulated characters.

According to the embodiment described above, since processing for generating a related image need not be performed, processing for generating an insert image directed at each of two or more cooperating players can be made more efficient.

(6) In the image generation system described above, the insert image generating means may use an insert image selected from insert images previously prepared for each of the plurality of manipulated characters to generate an insert image directed at each of the two or more cooperating players.

According to the embodiment described above, since processing for generating an insert image directed at each of two or more cooperating players need not be performed, processing for generating an insert image directed at each of the two or more cooperating players can be made even more efficient.

(7) In the image generation system described above, the insert image generating means may generate an insert image directed at each of the two or more cooperating players by replacing a part of a previously-generated insert image with another image.

According to the embodiment described above, since other parts of an insert image can be shared among two or more cooperating players, processing for generating an insert image directed at each of the two or more cooperating players can be made more efficient.

(8) In the image generation system described above, the insert image generating means may generate an insert image directed at each of the two or more cooperating players by adding another image to a previously-generated insert image.

According to the embodiment described above, since a part of an insert image can be shared among two or more cooperating players, processing for generating an insert image directed at each of the two or more cooperating players can be made more efficient.

(9) In the image generation system described above, the insert image generating means may further control presentation of insert images respectively directed at the two or more cooperating players in accordance with at least one of a game status and a relationship of the two or more cooperating players.

According to the embodiment described above, since the presentation of an insert image changes in accordance with at least one of a game status and a relationship (a presence or absence of friendship or the like) of two or more cooperating players, each cooperating player can get involved in the presentation of the insert image by changing at least one of a game status and a relationship with another cooperating player.

In this case, as the "game status", a collective parameter of two or more cooperating players or a parameter of a team to which the two or more cooperating players belong can be used and, for example, a collective stamina level of two or more cooperating players or a collective stamina level of a team to which the two or more cooperating players belong can be used.

In addition, the "relationship" may include whether or not friendship has been established (a presence or absence of a friend registration) between two or more cooperating players or the like.

Furthermore, "presentation" may include a presence or absence of a visual effect, a presence or absence of slow motion, and an extension or a reduction of a display time of a partial image.

(10) In the image generation system described above, the insert image generating means may generate, when a part of the given conditions is fulfilled, images related to the manipulated characters of the two or more cooperating players having cooperated with the fulfillment of the part of the given conditions, as insert images to be inserted into at least a game screen of a player who can cooperate with fulfilling a remainder of the given conditions.

According to the embodiment described above, when a part of the given conditions is fulfilled, since a player who can cooperate with fulfilling a remainder of the given conditions is provided with an image (such as a close-up shot image) related to a manipulated character of a cooperating player having cooperated with the fulfillment of a part of the given conditions, the player who can cooperate can be encouraged to cooperate. Therefore, cooperative play can be promoted.

(11) According to one embodiment of the invention, there is provided an image generation system which provides, to a plurality of players through terminals individually used by the plurality of players, an image of a game which progresses through cooperation of a plurality of manipulated characters individually manipulated by the plurality of players, the image generation system including:

game image generating means that generates an image of a game space in which the plurality of manipulated characters act, as a game screen directed at the plurality of players; and determining means that determines whether or not a game event that occurs based on manipulation information input by the plurality of players or the manipulation information fulfills given conditions, the game image generating means including insert image generating means that generates, when the given conditions are fulfilled, two or more images related to the manipulated characters of two or more cooperating players having cooperated with the fulfillment, as insert images to be inserted into game screens of at least the two or more cooperating players, and the game image generating means generating, when a part of the given conditions is fulfilled, images related to the manipulated characters of the two or more cooperating players having cooperated with the fulfillment of the part of the given conditions, as insert images to be inserted into at least a game screen of a player who can cooperate with fulfilling a remainder of the given conditions.

According to the embodiment described above, when a part of the given conditions is fulfilled, since a player who can cooperate with fulfilling a remainder of the given conditions is provided with an image (such as a close-up shot image) related to a manipulated character of a cooperating player having cooperated with the fulfillment of a part of the given conditions, the player who can cooperate can be encouraged to cooperate. Therefore, cooperative play can be promoted.

(12) According to one embodiment of the invention, there is provided a non-transitory computer-readable information storage medium storing a program of an image generation system which provides, to a plurality of players through terminals individually used by the plurality of players, an image of a game which progresses through cooperation of a plurality of manipulated characters individually manipulated by the plurality of players, the program causing a computer to function as:

game image generating means that generates an image of a game space in which the plurality of manipulated characters act, as a game screen directed at the plurality of players; and determining means that determines whether or not a game event that occurs based on manipulation information input by the plurality of players or the manipulation information fulfills given conditions, the game image generating means including insert image generating means that generates, when the given conditions are fulfilled, two or more images related to the manipulated characters of two or more cooperating players having cooperated with the fulfillment, as insert images to be inserted into game screens of at least the two or more cooperating players, and the insert image generating means generating the insert images respectively directed at the two or more cooperating players in accordance with the manipulated characters.

According to the embodiment described above, when given conditions are fulfilled with respect to a game event that occurs based on manipulation information or with respect to the manipulation information, an image related to manipulated characters of two or more cooperating player having cooperated with the fulfillment is inserted into a game screen of at least the two or more cooperating players. In addition, the insert image directed at each of the two or more cooperating players is generated in accordance with each manipulated character. Therefore, a cooperating player having cooperated with the fulfillment of conditions is provided with an insert image directed at himself/herself (an insert image exclusive for himself/herself or an insert image centered on himself/herself) as a reward for the cooperation. As a result, according to the embodiment described above, since a certain sense of specialness can be bestowed to a cooperating player, cooperation among individual players can be promoted and a game involving cooperative play can be energized.

Embodiments of the invention will be described below. It should be noted that the embodiments described below do not unduly limit the scope of the invention as set forth in the claims. All of the elements described in connection with the following embodiments should not necessarily be taken as essential requirements of the invention.

1. Game System

First, an overview and a general configuration of a game system 1 (an example of an image generation system) according to an embodiment of the invention will be described with reference to FIG. 1. FIG. 1 is a diagram illustrating an example of a configuration of the game system 1.

In the game system 1, as illustrated in FIG. 1, a server apparatus 10 (an example of an image generating apparatus) which provides a game service and a terminal apparatus 20 (for example, terminal apparatuses 20A, 20B, 20C, . . . ) are connectable to the Internet (an example of a network).

By accessing the server apparatus 10 from the terminal apparatus 20, a user can play a game being transmitted from the server apparatus 10 via the Internet. Furthermore, by accessing the server apparatus 10 from the terminal apparatus 20, the user can communicate with other users.

The server apparatus 10 is an information processing apparatus capable of providing a service that enables users to play a game via the terminal apparatus 20 connected to the server apparatus 10 via the Internet so as to be capable of communicating with the server apparatus 10. In addition, the server apparatus 10 may function as an SNS server which provides a communication-type service. In this case, an SNS server may be an information processing apparatus which provides a service that enables a plurality of users to communicate with each other.

Furthermore, for example, when the server apparatus 10 functions as an SNS server, the server apparatus 10 is capable of providing a game referred to as a social game which is executed using an operating environment (an application programming interface (API), a platform, or the like) of the provided SNS.

In particular, the server apparatus 10 is capable of providing games provided on a web browser of the terminal apparatus 20 including browser games (games which start by simply opening an installation site with a web browser) created in various languages such as HTML, FLASH, CGI, PHP, shockwave, a Java (registered trademark) applet, and JavaScript (registered trademark).

Social games differ from existing online games in that dedicated client software is not required, and include games that can be played with only a web browser and an SNS account. In addition, the server apparatus 10 is configured to be capable of being connected to a terminal (a smart phone, a personal computer, a game device, or the like) of another user via a network and providing an online game which enables a same game progress to be simultaneously shared online.

Meanwhile, the server apparatus 10 may be constituted by one (apparatus or processor) or a plurality of (apparatuses or processors).

In addition, information such as billing information and game information stored in a storage area (a storage unit 140 to be described later) of the server apparatus 10 may be stored in a database (a storage apparatus or a memory in a broad sense) connected via a network (an intranet or the Internet) or, when the server apparatus 10 functions as an SNS server, information such as user information 146 stored in the storage area may be stored in a database (a storage apparatus or a memory in a broad sense) connected via a network (an intranet or the Internet).

Specifically, the server apparatus 10 receives input information based on a manipulation by a user (in other words, a player executing a game) transmitted from the terminal apparatus 20 and performs game processing based on the received input information. In addition, the server apparatus 10 transmits a game processing result to the terminal apparatus 20, and the terminal apparatus 20 performs various processing so as to provide the user with the game processing result received from the server apparatus 10 in a viewable manner.

The terminal apparatus 20 is an information processing apparatus such as an image generating apparatus including a smart phone, a mobile phone, a PHS, a computer, a game apparatus, a PDA, and a mobile game device, and is capable of connecting to the server apparatus 10 via a network such as the Internet (a WAN) or a LAN. A communication line between the terminal apparatus 20 and the server apparatus 10 may be either wired or wireless.

In addition, the terminal apparatus 20 is provided with a web browser capable of viewing web pages (data in an HTML format). In other words, the terminal apparatus 20 has a communication control function for communicating with the server apparatus 10 and a web browser function for performing display control using data (web data, data created in the HTML format, etc.) received from the server apparatus 10, and executes various processing in order to provide the user with a game screen and enable the user to execute a game. However, the terminal apparatus 20 may acquire game control information provided by the server apparatus 10 and execute predetermined game processing, and execute a game based on the game processing.

Specifically, when the terminal apparatus 20 makes a request to perform a predetermined game to the server apparatus 10, the terminal apparatus 20 is connected to a game site of the server apparatus 10 and a game is started. In particular, by using an API as necessary, the terminal apparatus 20 causes the server apparatus 10 functioning as an SNS server to perform predetermined processing, or, to acquire the user information 146 managed by the server apparatus 10 functioning as an SNS server to execute a game.

2. Server Apparatus

Figure 2:
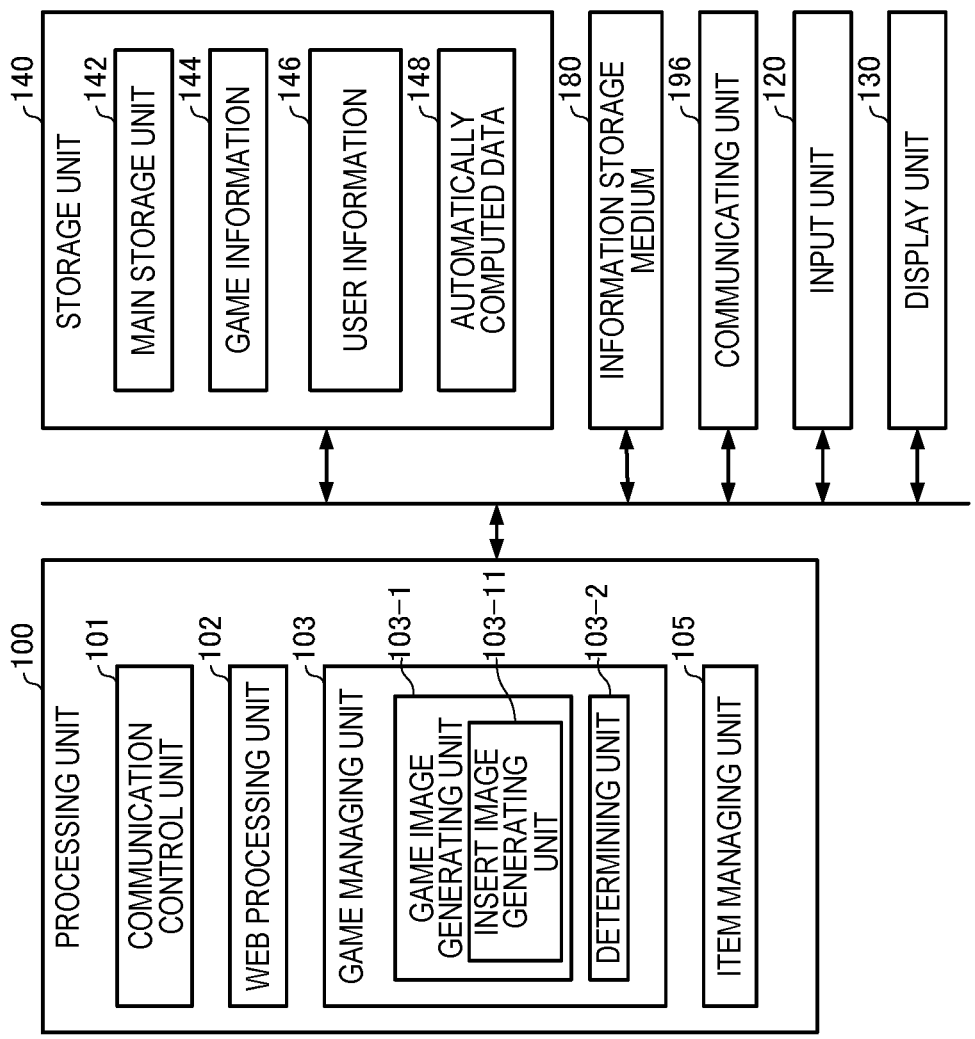
FIG. 2 is a functional block diagram illustrating an example of a server apparatus according to an embodiment of the invention.

Next, the server apparatus 10 will be described with reference to FIG. 2. Moreover, FIG. 2 is a functional block diagram illustrating the server apparatus 10. Alternatively, the server apparatus 10 may have a configuration in which a part of the components (units) illustrated in FIG. 2 is omitted.

The server apparatus 10 includes an input unit 120 used by an administrator (operator) or the like for input, a display unit 130 which performs predetermined display, an information storage medium 180 storing predetermined information, a communicating unit 196 for communicating with the terminal apparatus 20 etc., a processing unit 100 which executes processing mainly related to a game to be provided, and the storage unit 140 storing a variety of data mainly used in the game.

The input unit 120 is used by a system administrator etc. to input settings related to a game and other necessary settings and to input data. For example, the input unit 120 is constituted by a mouse, a keyboard, or the like.

The display unit 130 is for displaying an operation screen for the system administrator. For example, the display unit 130 is constituted by a liquid crystal display or the like.

The information storage medium 180 (a computer-readable medium) stores a program, data, etc., and a function of the information storage medium 180 is constituted by an optical disk (a CD or a DVD), a magneto-optical disk (MO), a magnetic disk, a hard disk, a magnetic tape, a memory (ROM), or the like.

The communicating unit 196 performs various control for communicating with the outside (for example, a terminal, another server, or another network system), and a function of the communicating unit 196 is constituted by hardware such as various processors and a communication ASIC, a program, or the like.

The storage unit 140 serves as a work area for the processing unit 100, the communicating unit 196, etc., and a function of the storage unit 140 is constituted by a RAM (VRAM) etc. Moreover, information stored in the storage unit 140 may be managed by a database.

The storage unit 140 stores game information 144 indicating information related to a game to be provided, user information 146 including information on items owned by each owner and information related to a user as a player with respect to the game to be provided, automatically computed data 148 generated by game processing (to be described later), and various other types of information necessary for game computation.

In this case, an item is an example of contents (in other words, digital contents) virtually existing in a game, and specific examples thereof include a character such as a player character, an item itself owned by each character such as a weapon, in-game currency, a tool, or life energy, and a virtual game medium which is used in the game and which defines the character or the item.

The processing unit 100 performs a variety of processing using a main storage unit 142 inside the storage unit 140 as a work area. Functions of the processing unit 100 can be realized by hardware such as various processors (a CPU, DSP, or the like) and an ASIC (a gate array or the like), and programs.

The processing unit 100 performs a variety of processing based on the program (data) stored in the information storage medium 180. In other words, the information storage medium 180 stores a program that causes a computer to function as each unit (a program which causes a computer to execute processing of each unit) of the present embodiment.

For example, the processing unit 100 (processor) performs, based on a program stored in the information storage medium 180, overall control of the server apparatus 10 as well as a variety of processing including control of delivery of data etc. between the respective units. Furthermore, the processing unit 100 performs processing for providing various services in response to a request from a terminal.

Specifically, the processing unit 100 includes at least a communication control unit 101, a web processing unit 102, a game managing unit 103, and an item managing unit 105.

The communication control unit 101 performs processing for transmitting and receiving data to and from the terminal apparatus 20 via the network. In other words, the server apparatus 10 performs a variety of processing based on information received by the communication control unit 101 from the terminal apparatus 20 etc.

In particular, the communication control unit 101 performs processing for transmitting, based on a request from the terminal apparatus 20 of a user, a game screen to the terminal apparatus 20 of the user.

The web processing unit 102 functions as a web server. For example, the web processing unit 102 performs, through a communication protocol such as Hypertext Transfer Protocol (HTTP), processing for transmitting data in response to a request by a web browser 211 installed on the terminal apparatus 20 and processing for receiving data transmitted by the web browser 211 of the terminal apparatus 20.

Moreover, while a case where the server apparatus 10 is provided with a function as an SNS server will be described as an example in the present embodiment, the server apparatus 10 may be separately formed as a game server and a server for SNS. In addition, the server apparatus 10 may perform a part of or all of processing of a game or the terminal apparatus 20 may perform a part of the processing of the game.

Based on an operation by a player input via the terminal apparatus 20, the game managing unit 103 sets characters (usable characters) and various items used by each player in a game such as an RPG (including a battle part) or a match-up game as deck data or the like and registers the deck data in user information 146.

In addition, based on parameters for the game (hereinafter, also referred to as "game parameters") included in the registered user information 146 and game information 144, the game managing unit 103 automatically computes a game in which each character acts in an object space (game space) and generates automatically computed data, and stores the automatically computed data as the automatically computed data 148 in the storage unit 140. For example, the game managing unit 103 controls a game such as an RPG (including a battle part) or a match-up game executed by each player, or executes game processing in an RPG (including a battle part) or a match-up game while executing management of the game.

Each player acquires automatically computed data using the player's own terminal apparatus 20 and is capable of watching a match-up game with other players etc. by playing back the automatically computed data using the terminal apparatus 20.

In addition, during the execution of a match-up game, the game managing unit 103 is capable of functioning as a game image generating unit 103-1 (an example of game image generating means) and a determining unit 103-2 (an example of determining means), and the game image generating unit 103-1 includes an insert image generating unit 103-11 (an example of insert image generating means). Details of processing by the game image generating unit 103-1, the determining unit 103-2, and the insert image generating unit 103-11 will be provided later.

3. Terminal Apparatus

Figure 3:
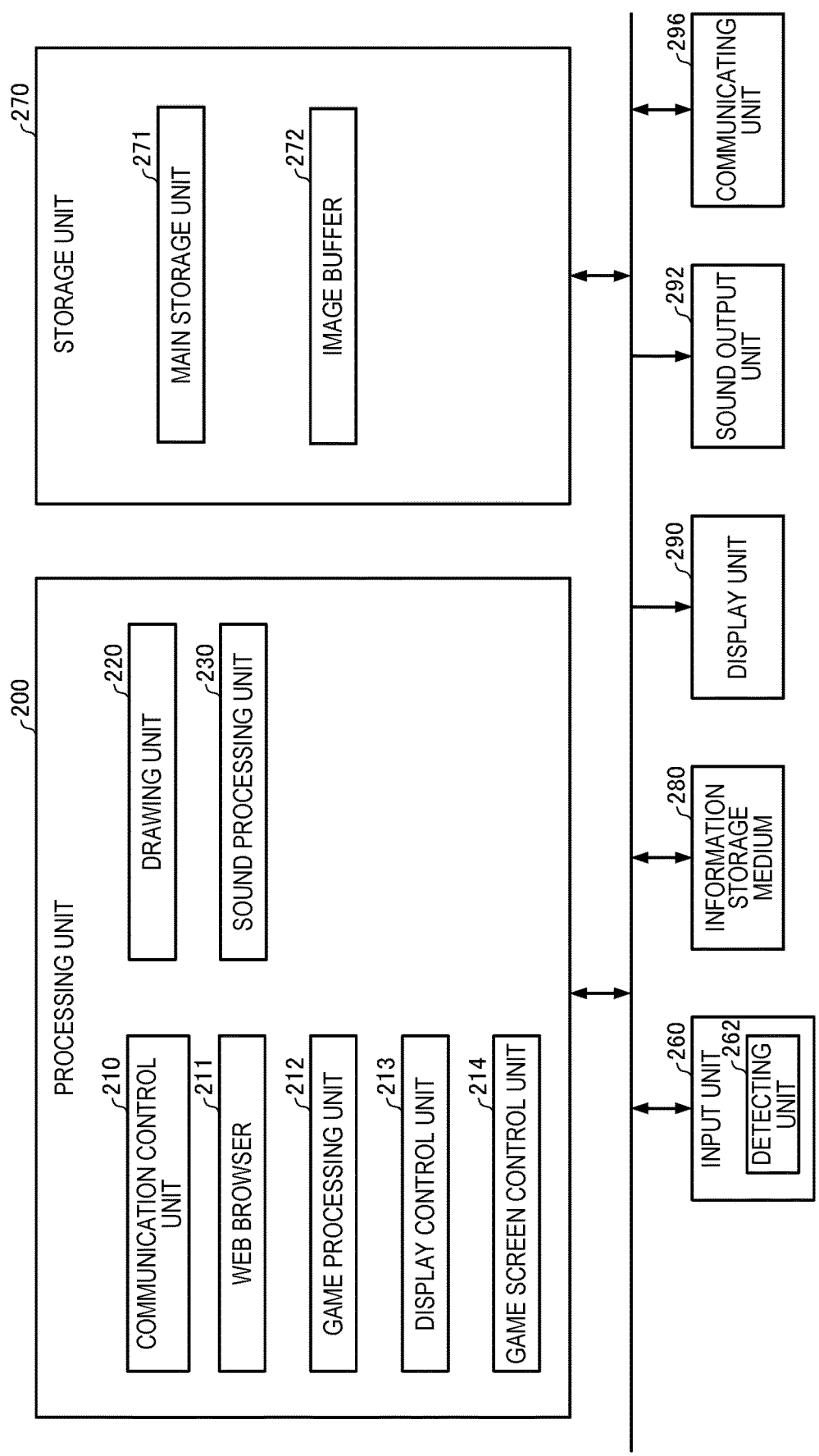
FIG. 3 is a functional block diagram illustrating an example of a terminal apparatus according to an embodiment of the invention.

Next, the terminal apparatus 20 (which refers to each of the terminal apparatuses 20A, 20B, 20C, . . . ) will be described with reference to FIG. 3. Moreover, FIG. 3 is a functional block diagram illustrating the terminal apparatus 20. Alternatively, the terminal apparatus 20 may have a configuration in which a part of the components (units) illustrated in FIG. 3 is omitted.

An input unit 260 is a device which enables a user to input input information and which outputs input information of the user to the processing unit 200. The input unit 260 is provided with a detecting unit 262 which detects input information (an input signal) of the user. Examples of the input unit 260 include a lever, a button, a steering wheel, a microphone, a touch panel-type display, a keyboard, and a mouse.

A storage unit 270 serves as a work area for the processing unit 200, a communicating unit 296, etc., and a function of the storage unit 270 can be realized by a RAM (VRAM) or the like. In addition, the storage unit 270 includes a main storage unit 271 to be used as a work area and an image buffer 272 storing a final display image etc. Alternatively, the storage unit 270 may have a configuration in which a part of these components is omitted.

An information storage medium 280 (a computer-readable medium) stores a program, data, etc., and a function of the information storage medium 280 can be realized by an optical disk (a CD or a DVD), a magneto-optical disk (MO), a magnetic disk, a hard disk, a magnetic tape, a memory (a ROM), or the like.

The processing unit 200 performs a variety of processing based on the program (data) stored in the information storage medium 280. The information storage medium 280 can store a program that causes a computer to function as each unit (a program which causes a computer to execute processing of each unit) of the present embodiment.

It should be noted that the communicating unit 296 may receive a program or game data which is stored in the information storage medium 180 or the storage unit 140 included in the server apparatus 10 and which causes a computer to function as each unit of the present embodiment via the network and store the received program or data in the information storage medium 280. The program or data received from the server apparatus 10 may be stored in the storage unit 270. Cases where a network system functions by receiving a program and data in this manner are also included in the scope of the invention.

A display unit 290 is for outputting an image generated by a drawing unit 220 and a function thereof can be realized by a CRT, an LCD, a touch panel-type display, a head-mounted display (HMD), or the like. A sound output unit 292 is for outputting sound generated by a sound processing unit 230 and a function thereof can be realized by a speaker, a headphone, or the like.

The communicating unit 296 performs various control for communicating with the outside (for example, another terminal or another server), and a function of the communicating unit 296 can be realized by hardware such as various processors and a communication ASIC, a program, or the like.

The processing unit 200 (processor) performs processing such as game processing, display control, an image generating process, and a sound generating process based on input information, a program, or the like from the input unit 260.

The processing unit 200 performs a variety of processing using the main storage unit 271 inside the storage unit 270 as a work area. Functions of the processing unit 200 can be realized by hardware such as various processors (a CPU, DSP, or the like) and an ASIC (a gate array or the like), and programs.

The processing unit 200 includes a communication control unit 210, the web browser 211, a game processing unit 212, a display control unit 213, a game screen control unit 214, the drawing unit 220, and the sound processing unit 230. Alternatively, the processing unit 200 may have a configuration in which a part of these components is omitted.

The communication control unit 210 performs processing for transmitting and receiving data to and from the server apparatus 10. In addition, the communication control unit 210 performs processing for storing data received from the server apparatus 10 in the storage unit 270, processing for analyzing received data, processing for controlling transmission and reception of other data, etc. Moreover, the communication control unit 210 may perform processing for storing address information (an IP address and a port number) of the server in the information storage medium 280 and managing the stored address information. Furthermore, the communication control unit 210 may communicate with the server apparatus 10 when receiving input information to start communication from a user.

The communication control unit 210 performs processing for transmitting identification information of a user to the server apparatus 10 and receiving data (a web page, a game screen, etc. of the user) related to the user information 146 from the server apparatus 10. For example, the communication control unit 210 performs processing for receiving, from the server apparatus 10, data including information on another user (a name of the other user, information posted by the other user, etc.) in a friendship with the user.

Moreover, the communication control unit 210 may perform data transmission/reception to/from the server apparatus 10 at predetermined cycles or may perform data transmission/reception to/from the server apparatus 10 when receiving input information from the input unit 260. In addition, the communication control unit 210 may perform processing for receiving a game screen from the server apparatus 10.

The web browser 211 is an application program for viewing a web page (a game screen), and performs display control by downloading an HTML file, an image file, or the like from the web server (the server apparatus 10) and analyzing a layout of the downloaded file. In addition, the web browser 211 transmits data to the web server (the server apparatus 10) using an input form (a link, a button, a text box, or the like).

The web browser 211 is also capable of realizing a browser game. For example, the web browser 211 may execute a program which is received from the web server (the server apparatus 10) and which is written in JavaScript (registered trademark), FLASH, Java (registered trademark), or the like.

The terminal apparatus 20 can cause the web browser 211 to display information from a web server specified by an URL via the Internet. For example, the terminal apparatus 20 can cause the web browser 211 to display a game screen (data such as HTML) received from the server apparatus 10.

The game processing unit 212 performs a variety of processing for game computation. Examples thereof include processing for starting a game when game start conditions are fulfilled, processing for advancing the game, and processing for ending a game when game end conditions are fulfilled.

In addition, the game processing unit 212 may perform processing for arranging and setting various objects (objects constituted by primitives such as polygons, free-form surfaces, and subdivision surfaces) representing a displayed article such as a user's character, a building, a stadium, a vehicle, a tree, a pillar, a wall, or a map (land form) in an object space (a game space).

In this case, an object space refers to a virtual space and includes both a two-dimensional space and a three-dimensional space. A two-dimensional space is a space in which, for example, an object is arranged on a two-dimensional coordinate (X, Y), and a three-dimensional space is a space in which, for example, an object is arranged in a three-dimensional coordinate (X, Y, Z).

In addition, the game processing unit 212 executes game processing including reproducing automatically computed data received from the server apparatus 10.

Furthermore, the display control unit 213 performs processing for displaying a game screen generated by the game screen control unit 214 on the display unit 290. For example, the display control unit 213 may display a game screen using the web browser 211.

The drawing unit 220 performs an image drawing process based on a variety of processing (for example, game processing) performed by the processing unit 200 and, accordingly, generates an image and outputs the generated image to the display unit 290 through the display control unit 213. The image generated by the drawing unit 220 may be a so-called two-dimensional image or a so-called three-dimensional image.

The sound processing unit 230 performs sound processing based on results of a variety of processing performed by the processing unit 200, generates game sounds including a BGM, a sound effect, and voices, and outputs the game sounds to the sound output unit 292.

4. Overview

In the game system 1, the server apparatus 10 provides a plurality of players with a match-up game which proceeds due to cooperation by a plurality of manipulated characters individually manipulated by the plurality of players. To this end, the server apparatus 10 provides the plurality of players with an image of the match-up game via the terminal apparatuses 20 individually used by the plurality of players.

In this description, a first player who is a user of the terminal apparatus 20A, a second player who is a user of the terminal apparatus 20B, a third player who is a user of the terminal apparatus 20C, and a fourth player who is a user of the terminal apparatus 20D are assumed as players to participate in the match-up game. In addition, in this description, it is assumed that a manipulated object of the first player is a manipulated character A, a manipulated object of the second player is a manipulated character B, a manipulated object of the third player is a manipulated character C, and a manipulated object of the fourth player is a manipulated character D. Furthermore, in the match-up game, a case is assumed where a team (an ally team) constituted by the four manipulated characters A, B, C, and D matches up against an enemy character who is an NPC.

4.1. User Information

FIG. 4 is a diagram for explaining the user information 146 in the storage unit 140 of the server apparatus 10.

As illustrated in FIG. 4, user information 146 stores, for each player (for each player ID), types of characters usable in the match-up game by a user (player) having registered as a user in the server apparatus 10, a level of the player, information for the player to specify other players registered as a friend of the player, information for the player to specify a match-up in which the player is participating (including whether or not the player is participating in a match-up), etc. The user information 146 is referred to when appropriate by the game managing unit 103 during a match-up game. Moreover, information other than that illustrated in FIG. 4 such as information indicating attributes (age group, gender, etc.) of the player may be written in the user information 146.

4.2. Game Information

FIG. 5 is a diagram for explaining the game information 144 in the storage unit 140 of the server apparatus 10.

As illustrated in FIG. 5, the game information 144 stores, for each match-up, information (a player ID) for specifying a player participating in the match-up.

In addition, the game information 144 stores, for each match-up, a type of manipulated character used by a player in the match-up, a stamina level of the manipulated character, a deadly strike parameter of the manipulated character, a collective stamina level of a team of which the manipulated character is a member, a stamina level of an enemy character of the match-up, a deadly strike parameter of the enemy character, etc.

Moreover, in FIG. 5, the manipulated character A of a player (referred to as a first player) to which a player ID "001" is assigned is a manipulated character selected by the first player prior to the game from manipulated characters (in the example illustrated in FIG. 4, the manipulated character A) usable by the first player.

In addition, in FIG. 5, the manipulated character B who is manipulated by a player (referred to as a second player) to which a player ID "002" is assigned is a manipulated character selected by the second player prior to the game from manipulated characters (in the example illustrated in FIG. 4, the manipulated characters A and B) usable by the second player.

Furthermore, in FIG. 5, the manipulated character C who is manipulated by a player (referred to as a third player) to which a player ID "003" is assigned is a manipulated character selected by the third player prior to the game from manipulated characters (in the example illustrated in FIG. 4, the manipulated characters A, B, and C) usable by the third player.

In addition, in FIG. 5, the manipulated character D who is manipulated by a player (referred to as a fourth player) to which a player ID "004" is assigned is a manipulated character selected by the fourth player prior to the game from manipulated characters (in the example illustrated in FIG. 4, the manipulated characters A, B, C, and D) usable by the fourth player.

The game information 144 described above is managed by the game managing unit 103 for each match-up and used to generate automatically computed data of each match-up. Moreover, information other than that illustrated in FIG. 5 such as a level of the manipulated character may be written in the game information 144. The following description will focus on a match-up (in the example illustrated in FIG. 5, a "first match-up") in which the first player, the second player, the third player, and the fourth player are currently participating.

4.3. Game Screen

Figure 6:
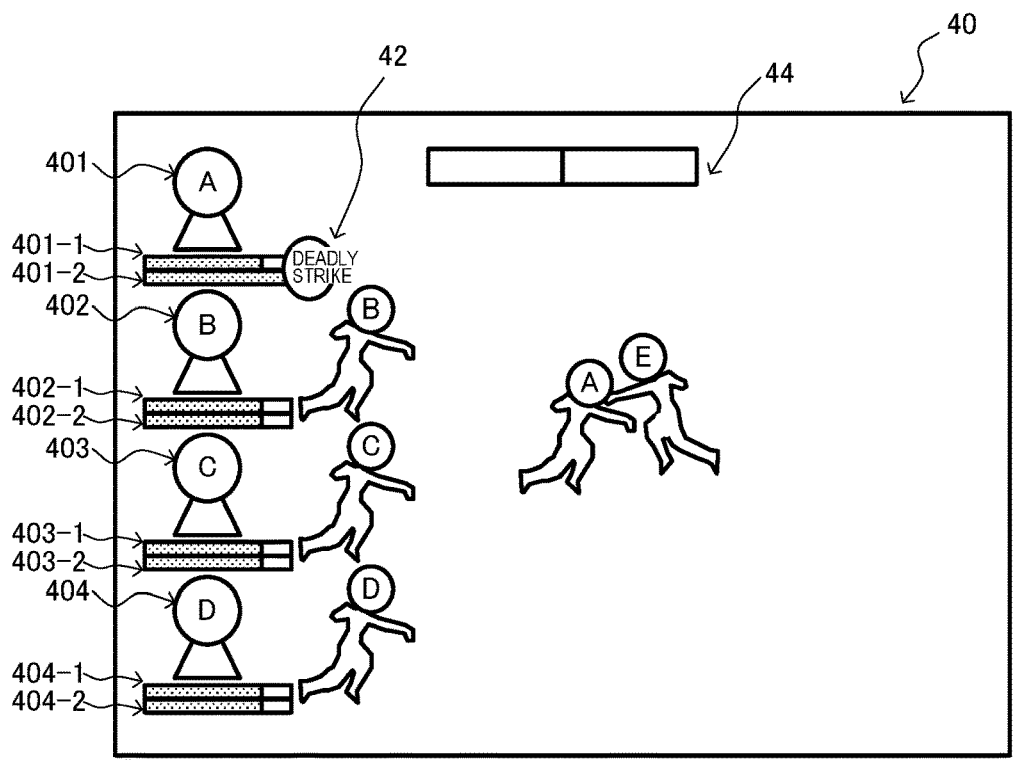
FIG. 6 illustrates an example of a game image displayed on a terminal apparatus according to an embodiment of the invention.

FIG. 6 illustrates a game screen 40 representing a game space. Display destinations of the game screen 40 are the terminal apparatus 20A used by the first player participating in the match-up, the terminal apparatus 20B used by the second player participating in the match-up, the terminal apparatus 20C used by the third player participating in the match-up, and the terminal apparatus 20D used by the fourth player participating in the match-up.

First, an image of the game space is displayed on the game screen 40. In the game space, the manipulated character A manipulated by the first player, the manipulated character B manipulated by the second player, the manipulated character C manipulated by the third player, the manipulated character D manipulated by the fourth player, and the enemy character E act. FIG. 6 represents a situation where the manipulated character A is directly engaging with the enemy character E and, at the same time, the manipulated characters B, C, and D are awaiting their turns.

Moreover, in FIG. 6, the respective characters are distinguished from one another by attaching a symbol "A" to the head of the manipulated character A, attaching a symbol "B" to the head of the manipulated character B, attaching a symbol "C" to the head of the manipulated character C, attaching a symbol "D" to the head of the manipulated character D, and attaching a symbol "E" to the head of the enemy character E (the same description also applies to other diagrams). However, on the actual game screen 40, each character may be distinguished by at least one of the face, a hairstyle, a body shape, clothing, and equipment of the character.

A superior-inferior gauge 44 is arranged at an upper end section of the game screen 40 when facing the game screen 40. The superior-inferior gauge 44 reflects a superior-inferior relationship between a collective stamina level of an entire ally team (a stamina level of the ally team) and a stamina level of the enemy character E. A match-up ends when one of the stamina level of the ally team and the stamina level of the enemy character E drops to zero before a predetermined time elapses from the start of the match-up. Whichever side between the ally team and the enemy character E with a remaining stamina level wins while the side whose stamina level drops to zero loses. On the other hand, when neither of the stamina levels drops to zero before a predetermined time elapses from the start of the match-up, whichever side with a higher stamina level at a time point when the predetermined time elapses wins while the side with a lower stamina level loses.

In addition, in a left end section of the game screen 40 when facing the game screen 40, a close-up shot 401 of the manipulated character A (hereinafter, referred to as a "close-up image 401 of the manipulated character A"), a close-up shot 402 of the manipulated character B (hereinafter, referred to as a "close-up image 402 of the manipulated character B"), a close-up shot 403 of the manipulated character C (hereinafter, referred to as a "close-up image 403 of the manipulated character C"), and a close-up shot 404 of the manipulated character D (hereinafter, referred to as a "close-up image 404 of the manipulated character D") are arranged from top to bottom in this order.

A stamina gauge 401-1 and a deadly strike gauge 401-2 of the manipulated character A are arranged near the close-up image 401 of the manipulated character A. In a similar manner, a stamina gauge 402-1 and a deadly strike gauge 402-2 of the manipulated character B are arranged near the close-up image 402 of the manipulated character B, a stamina gauge 403-1 and a deadly strike gauge 403-2 of the manipulated character C are arranged near the close-up image 403 of the manipulated character C, and a stamina gauge 404-1 and a deadly strike gauge 404-2 of the manipulated character D are individually arranged near the close-up image 404 of the manipulated character D.

The stamina gauge 401-1 is a gauge indicating the stamina level of the manipulated character A, and the deadly strike gauge 401-2 is a gauge indicating a deadly strike parameter of the manipulated character A. In a similar manner, the stamina gauge 402-1 is a gauge indicating the stamina level of the manipulated character B, the deadly strike gauge 402-2 is a gauge indicating a deadly strike parameter of the manipulated character B, the stamina gauge 403-1 is a gauge indicating the stamina level of the manipulated character C, the deadly strike gauge 403-2 is a gauge indicating a deadly strike parameter of the manipulated character C, the stamina gauge 404-1 is a gauge indicating the stamina level of the manipulated character D, and the deadly strike gauge 404-2 is a gauge indicating a deadly strike parameter of the manipulated character D.

4.4. Parameters

In order for each of the manipulated characters A, B, C, and D to attack the enemy character E, consumption of the character's stamina level is required, and when each of the manipulated characters A, B, C, and D sustains damage from the enemy character E, the character's stamina level attenuates but recovers with the passage of time. In addition, in order for each of the manipulated characters A, B, C, and D to launch a deadly strike, consumption of the character's deadly strike parameter is required but the deadly strike parameters recover with the passage of time.

When the deadly strike parameter of the manipulated character A reaches an upper limit, a deadly strike button 42 appears near the deadly strike gauge 401-2 (FIG. 6). When the first player taps the deadly strike button 42 (FIG. 7), the manipulated character A can launch a deadly strike at the enemy character E. In a similar manner, when the deadly strike parameter of the manipulated character B reaches an upper limit, a deadly strike button (not shown) appears near the deadly strike gauge 402-2. When the second player taps the deadly strike button (not shown), the manipulated character B can launch a deadly strike at the enemy character E. In a similar manner, when the deadly strike parameter of the manipulated character C reaches an upper limit, a deadly strike button (not shown) appears near the deadly strike gauge 403-2. When the third player taps the deadly strike button (not shown), the manipulated character C can launch a deadly strike at the enemy character E. In a similar manner, when the deadly strike parameter of the manipulated character D reaches an upper limit, a deadly strike button (not shown) appears near the deadly strike gauge 404-2. When the fourth player taps the deadly strike button (not shown), the manipulated character D can launch a deadly strike at the enemy character E.

4.5. Attack Sequence

During a match-up, a sequence of attacks by the manipulated characters A, B, C, and D on the enemy character E may be a sequence determined in advance, a sequence automatically decided by the game managing unit 103, or a sequence in which the first player, the second player, the third player, and the fourth player tap a given button (such as an attack button (not shown)).

4.6. Number of Characters

While the number of characters constituting the ally team is set to "4" in the present embodiment, the number of characters may be set to a plurality other than "4". In addition, while the number of the enemy character E is set to "1" in the present embodiment, a plurality of enemy characters E may constitute a team (an enemy team). Furthermore, while the enemy character E is an NPC in the present embodiment, the enemy character E may be a manipulated character manipulated by another player. Moreover, when each of a plurality of enemy characters E is a manipulated character, the description of the ally team in the present embodiment can be applied in a similar manner to the enemy team constituted by the plurality of enemy characters E.

4.7. Game Managing Unit

The game managing unit 103 arranges the manipulated character A of the first player participating in the match-up, the manipulated character B of the second player participating in the match-up, the manipulated character C of the third player participating in the match-up, the manipulated character D of the fourth player participating in the match-up, and the enemy character E in the game space (refer to FIG. 6).

In addition, when the game managing unit 103 receives a manipulation command from any of the terminal apparatuses 20A, 20B, 20C, and 20D via the Internet, the game managing unit 103 controls, in accordance with the manipulation command, an action (an action in the game space) of the manipulated character manipulated by a user (player) of the terminal apparatus being a transmission source of the manipulation command. Moreover, an "action of the manipulated character" as used herein refers to an action of the manipulated character in the game space.

Furthermore, the game managing unit 103 controls an action of the enemy character E in the game space in accordance with an algorithm determined in advance and actions of the manipulated characters A, B, C, and D and, at the same time, controls respective parameters (refer to FIG. 5) of the manipulated characters A, B, C, and D and the enemy character E in accordance with actions of the manipulated characters A, B, C, and D and the enemy character E in the game space.

In addition, the game managing unit 103 generates a moving image (the game screen 40) portraying the game space in which these characters act as the automatically computed data 148. Furthermore, the game managing unit 103 adds images (stamina gauges and deadly strike gauges) of gauges (symbols 44, 401-1, 401-2, 402-1, 402-2, . . . ) to be superimposed on the game screen 40, an insert image (which may also be referred to as a "cut-in image") to be inserted to the game screen 40, etc. to a part of the automatically computed data 148. The automatically computed data 148 generated by the game managing unit 103 is transmitted to the terminal apparatuses 20A, 20B, 20C, and 20D via the communicating unit 196. Each of the terminal apparatuses 20A, 20B, 20C, and 20D displays the game screen 40 on each display unit 290 based on the automatically computed data.

In addition, the game managing unit 103 updates the automatically computed data 148 in accordance with the progress of the game. When the game managing unit 103 updates the automatically computed data 148, the communicating unit 196 of the server apparatus 10 distributes data necessary for the update to the terminal apparatuses 20A, 20B, 20C, and 20D. Upon receiving the data, each of the terminal apparatuses 20A, 20B, 20C, and 20D updates the displayed game screen 40 in accordance with the data.

4.8. Basic Processing by Game Image Generating Unit

The game image generating unit 103-1 of the game managing unit 103 performs a function of generating an image of the game space in which the plurality of manipulated characters A, B, C, and D and the enemy character E act as the game screen 40 directed at the first player, the second player, the third player, and the fourth player. The generated game screen 40 is distributed to the terminal apparatuses 20A, 20B, 20C, and 20D as the automatically computed data 148 described earlier.

4.9. Determining Unit

The determining unit 103-2 of the game managing unit 103 determines whether or not a game event that occurs based on manipulation information input by the first player, the second player, the third player, or the fourth player via their own terminal apparatus 20 or a manipulation command thereof fulfills given conditions.

Hereinafter, the launching of a deadly strike is assumed as the game event, and a specific manipulation command (in this case, a manipulation command input by tapping the deadly strike button) which causes each of the manipulated characters A, B, C, and D to launch a deadly strike on the enemy character E is assumed as the manipulation information. In addition, a "combo condition" in which the manipulation command is successively input is assumed as the given condition.

When each of the terminal apparatuses 20A, 20B, 20C, and 20D receives a manipulation command related to a deadly strike from its own user (player) via the input unit 260, the terminal apparatus transmits the manipulation command to the server apparatus 10 together with a player ID of the player. Based on the player ID received with the manipulation command, the determining unit 103-2 of the server apparatus 10 can specify the player who is a transmission source of the manipulation command.

In addition, the determining unit 103-2 determines whether or not a next manipulation command (a second manipulation command) is received within a time limit (for example, within 2 seconds) from a time point of reception of an initial manipulation command (a first manipulation command) by the server apparatus 10, and when the next manipulation command is received, considers that the first manipulation command and the second manipulation command fulfill the combo condition (a 2-hit combo condition).

After the 2-hit combo condition is fulfilled, the determining unit 103-2 determines whether or not a third manipulation command is received within a time limit (for example, within 2 seconds) from a time point of reception of the second manipulation command, and when the third manipulation command is received, considers that the first manipulation command, the second manipulation command, and the third manipulation command fulfill a 3-hit combo condition.

After the 3-hit combo condition is fulfilled, the determining unit 103-2 determines whether or not a fourth manipulation command is received within a time limit (for example, within 2 seconds) from a time point of reception of the third manipulation command, and when the fourth manipulation command is received, considers that the first manipulation command, the second manipulation command, the third manipulation command, and the fourth manipulation command fulfill a 4-hit combo condition.

4.10. Details of Game Image Generating Unit

As described earlier, the game image generating unit 103-1 generates an image of the game space in which the manipulated characters A, B, C, and D act as a game screen directed at the first player, the second player, the third player, and the fourth player. The game screen is distributed to the terminal apparatuses 20A, 20B, 20C, and 20D as the automatically computed data 148.

In addition, when a part of the 4-hit combo condition is fulfilled (in other words, when a manipulation command related to a deadly strike (hereinafter, simply referred to as a "manipulation command") is input, when the 2-hit combo condition is fulfilled, or when the 3-hit combo condition is fulfilled), the insert image generating unit 103-11 of the game image generating unit 103-1 generates an image related to the manipulated characters of the cooperating players having cooperated with fulfilling the part of the 4-hit combo condition as an insert image to be inserted into the game screen of at least a player who can cooperate with fulfilling a remainder of the 4-hit combo condition. The insert image is distributed to the terminal apparatuses 20A, 20B, 20C, and 20D as the automatically computed data 148.

For example, when the first player is the first to input the manipulation command, the cooperating player having cooperated with fulfilling a part of the 4-hit combo condition is the first player, and the players who can cooperate with fulfilling the remainder of the 4-hit combo condition are the second player, the third player, and the fourth player.

In addition, for example, when the first player and the second player successively input the manipulation command (when the 2-hit combo condition is fulfilled), the cooperating players having cooperated with fulfilling a part of the 4-hit combo condition are the first player and the second player, and the players who can cooperate with fulfilling the remainder of the 4-hit combo condition are the third player and the fourth player.

Furthermore, for example, when the first player, the second player, and the third player successively input the manipulation command (when the 3-hit combo condition is fulfilled), the cooperating players having cooperated with fulfilling a part of the 4-hit combo condition are the first player, the second player, and the third player, and the player who can cooperate with fulfilling the remainder of the 4-hit combo condition is the fourth player.

Figure 8:
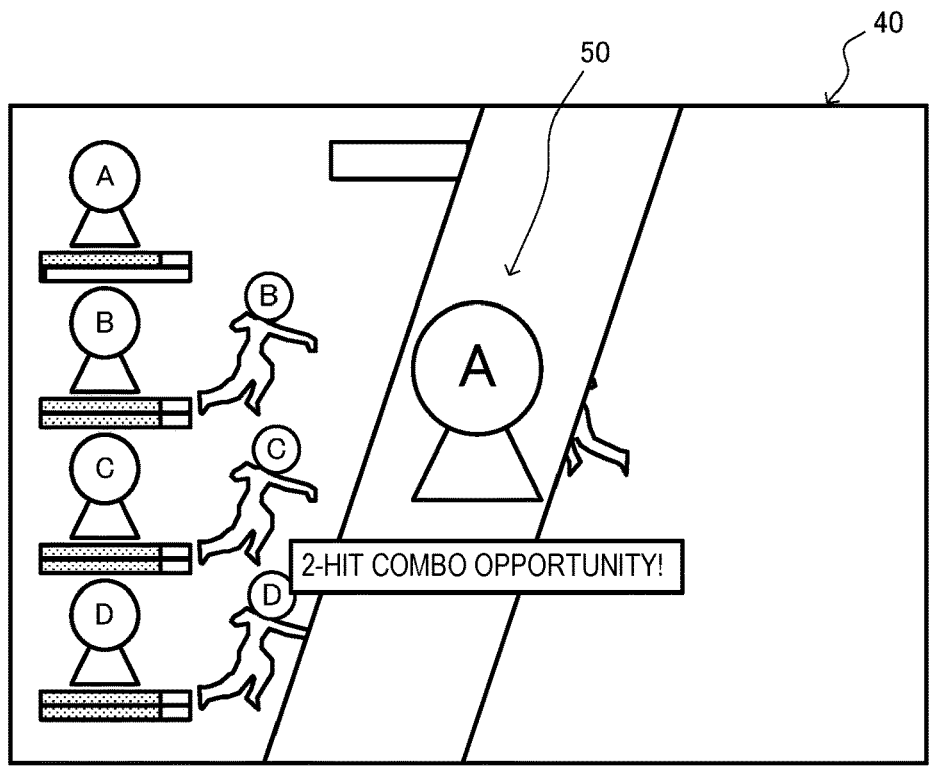
FIG. 8 illustrates an example of an insert image to be inserted into a game screen according to an embodiment of the invention.

FIG. 8 illustrates a state where, when the first player inputs the manipulation command, a close-up image 50 of the manipulated character A manipulated by the first player is inserted (which may also be referred to as "cut-in") to the game screen 40 of each player participating in the match-up. Due to the insertion of the close-up image 50, the first player can be made aware of the fact that the input of the manipulation command had been successful and the remaining players, namely, the second player, the third player, and the fourth player can be prompted to participate in a 2-hit combo.

Figure 9:
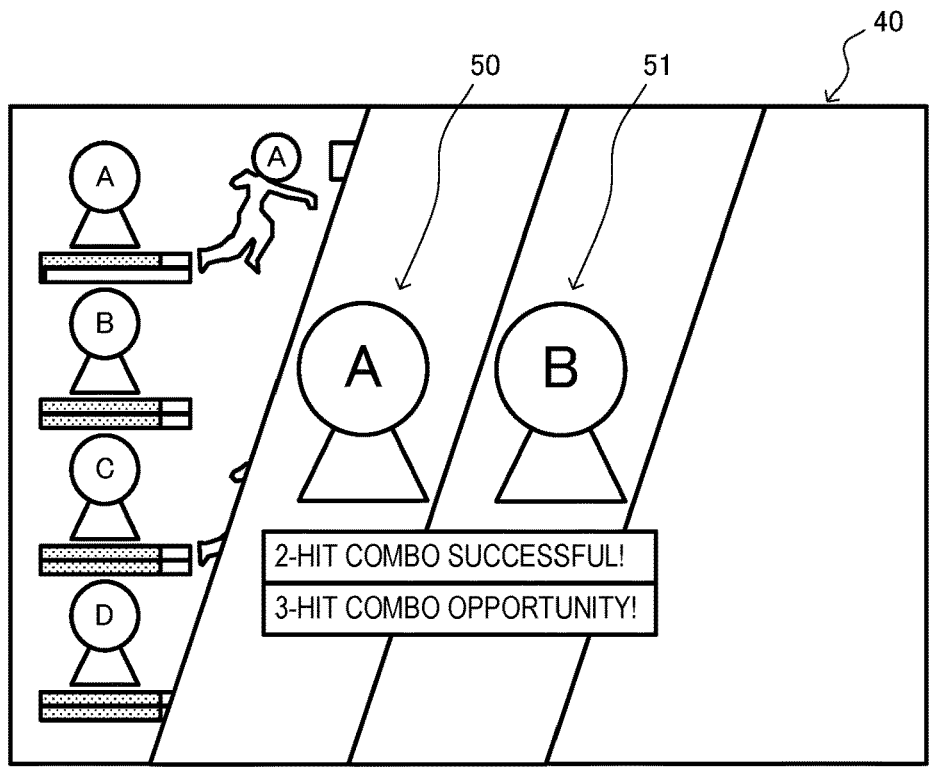
FIG. 9 illustrates an example of an insert image when the number of cooperating players is "2" in an embodiment of the invention.

FIG. 9 illustrates a state where, when the second player inputs the manipulation command following the first player and the 2-hit combo condition is fulfilled, close-up images 50 and 51 of the manipulated characters A and B manipulated by the first player and the second player are inserted to the game screen 40 of each player participating in the match-up. Due to the insertion of the close-up images 50 and 51, the first player and the second player can be made aware of the fact that the players have successfully contributed to a 2-hit combo, and the third player and the fourth player can be prompted to participate in a 3-hit combo.

Figure 10:
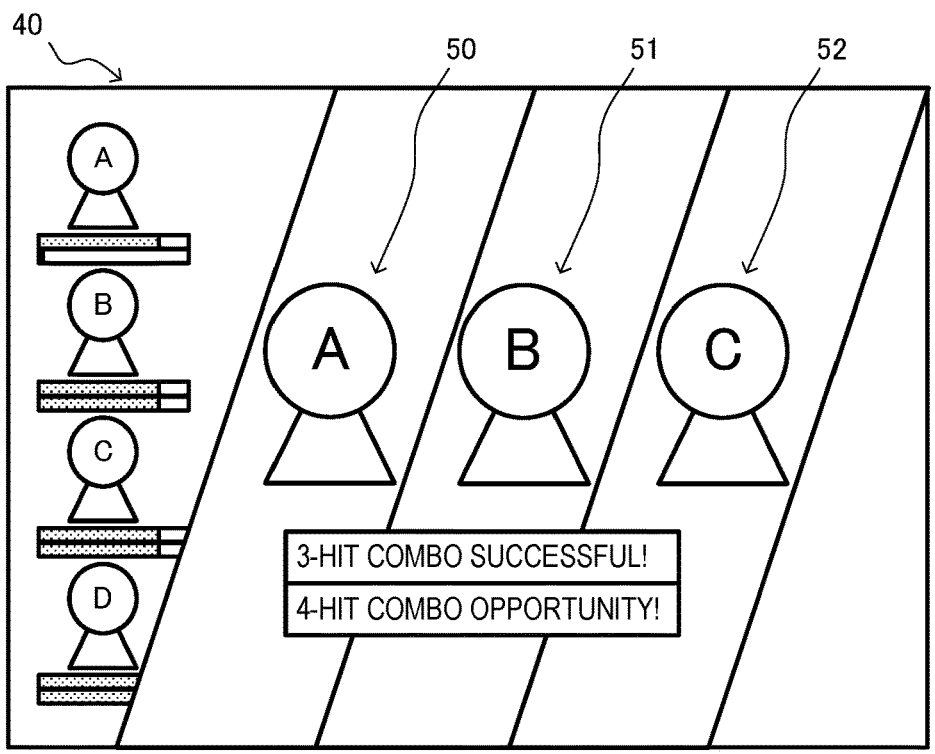
FIG. 10 illustrates an example of an insert image when the number of cooperating players is "3" in an embodiment of the invention.

FIG. 10 illustrates a state where, when the third player inputs the manipulation command following the first player and the second player and the 3-hit combo condition is fulfilled, close-up images 50, 51, and 52 of the manipulated characters A, B, and C manipulated by the first player, the second player, and the third player are inserted to the game screen 40 of each player participating in the match-up. Due to the insertion of the close-up images 50, 51, and 52, the first player, the second player, and the third player can be made aware of the fact that the players have successfully contributed to a 3-hit combo, and the fourth player can be prompted to participate in a 4-hit combo.

When the 4-hit combo condition is fulfilled, the insert image generating unit 103-11 generates an image related to manipulated characters (in this case, the manipulated characters A, B, C, and D) of two or more cooperating players (in this case, four players) having cooperated with the fulfillment, as an insert image to be inserted into the game screen 40 of at least the two or more cooperating players (in this case, four players).

Figure 11:
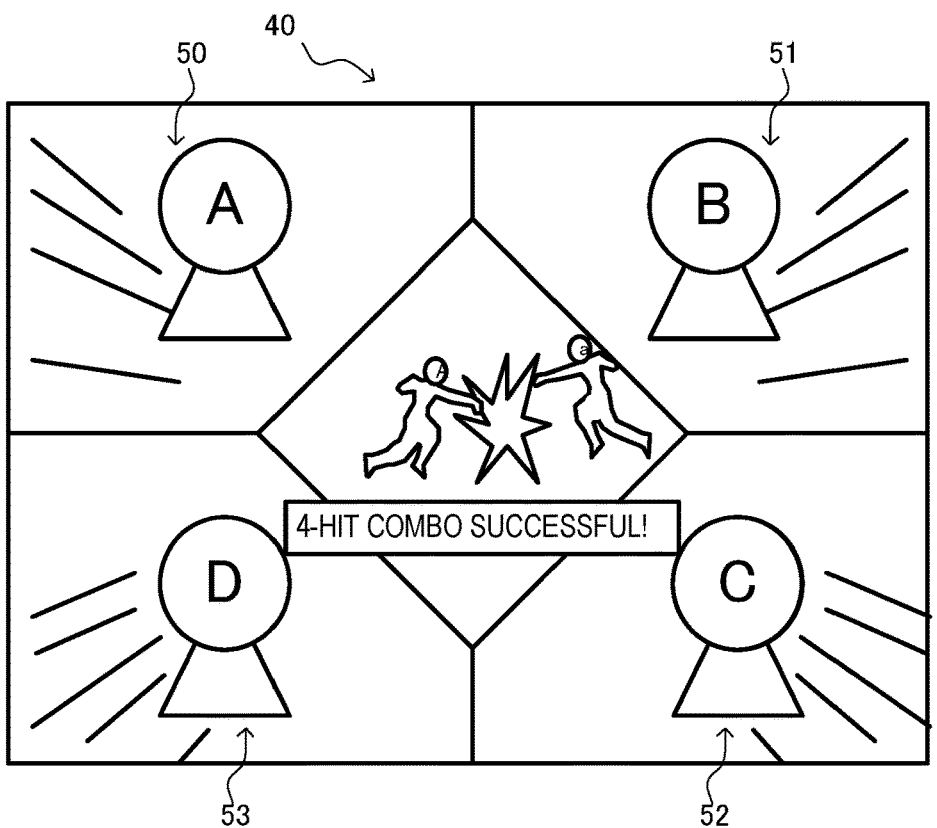
FIG. 11 illustrates an example of an insert image when the number of cooperating players is "4" in an embodiment of the invention.

FIG. 11 illustrates a state where, when the fourth player inputs the manipulation command following the first player, the second player, and the third player and the 4-hit combo condition is fulfilled, close-up images 50, 51, 52, and 53 of the manipulated characters A, B, C, and D manipulated by the first player, the second player, the third player, and the fourth player are inserted to the game screen 40 of each player participating in the match-up. Due to the insertion of the close-up images 50, 51, 52, and 53, each player participating in the match-up can be informed of the achievement of the 4-hit combo.

Subsequently, the insert image generating unit 103-11 further individually generates an insert image directed at each of the two or more cooperating players (in this case, four players) in accordance with each of the manipulated characters (in this case, the manipulated characters A, B, C, and D).

Figure 12A:
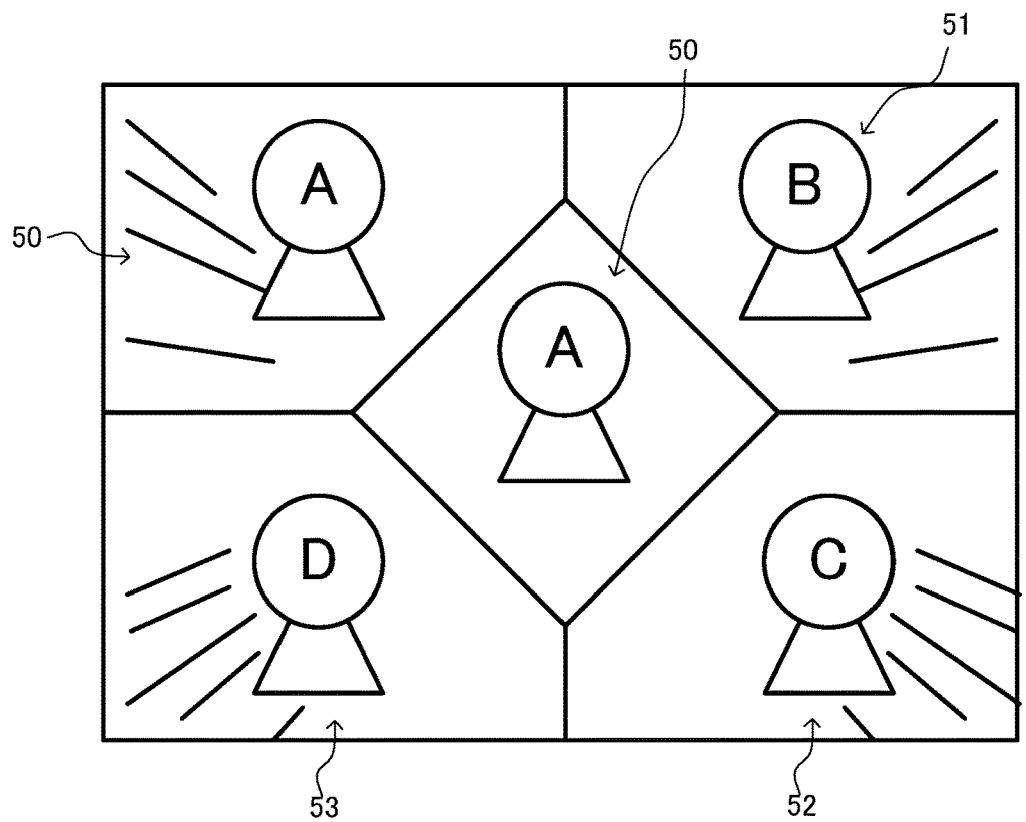
FIG. 12A is a diagram illustrating an example of an individual insert image generated in accordance with a manipulated character A in an embodiment of the invention.

For example, when one of the two or more cooperating players is the first player, the insert image generating unit 103-11 generates an individual insert image directed at the first player in accordance with the manipulated character A manipulated by the first player (FIG. 12A). In the individual insert image illustrated in FIG. 12A, the close-up images 50, 51, 52, and 53 of the manipulated characters A, B, C, and D of the four cooperating players are arranged in a ring shape, and the close-up image 50 of the manipulated character A of the first player is arranged at a center of the ring. This insert image (FIG. 12A) is transmitted toward the terminal apparatus 20A and inserted to the game screen 40 of the terminal apparatus 20A.

It should be noted that, in FIG. 12A, a frame of the close-up image 50 may be set to a different color from frames of the other close-up images 51, 52, and 53. In addition, in FIG. 12A, a size of the close-up image 50 may be set larger than the other close-up images 51, 52, and 53. Furthermore, in FIG. 12A, the close-up image 50 may be displayed as an animation. Moreover, a conversation voice (a dialogue) of the manipulated character A may be output while the insert image illustrated in FIG. 12A is being displayed.

Figure 12B:
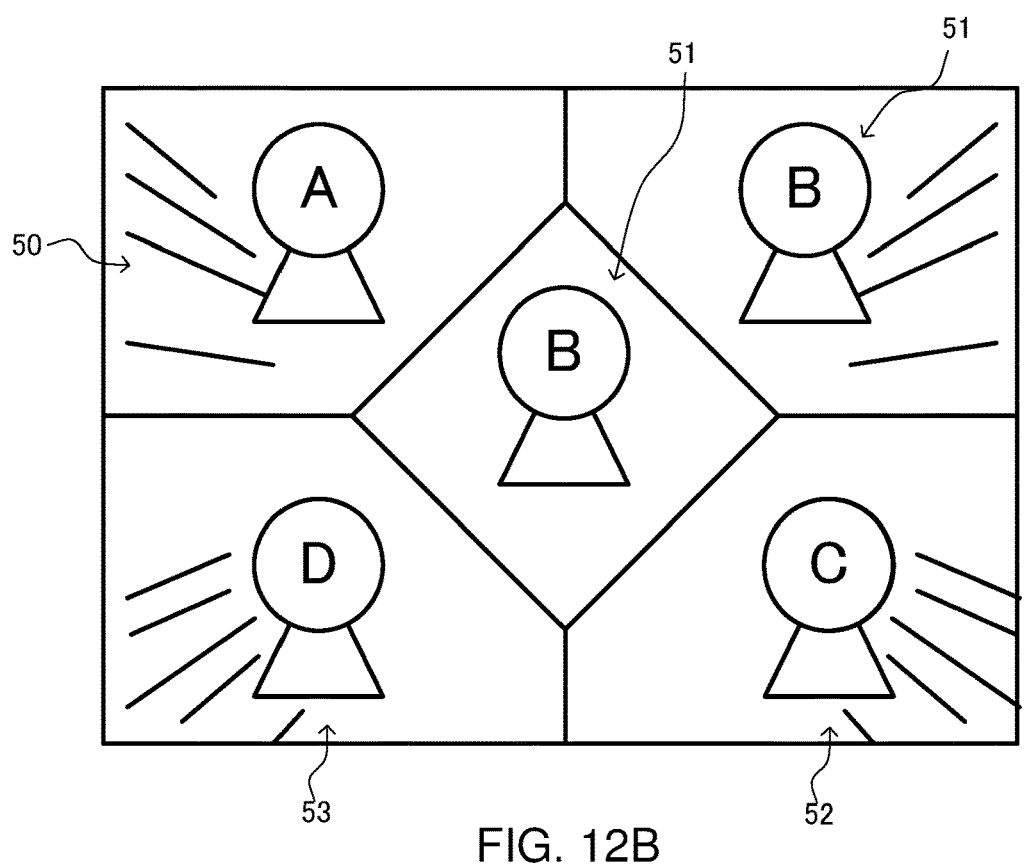
FIG. 12B is a diagram illustrating an example of an individual insert image generated in accordance with a manipulated character B in an embodiment of the invention.

When one of the two or more cooperating players is the second player, the insert image generating unit 103-11 generates an individual insert image directed at the second player in accordance with the manipulated character B manipulated by the second player (FIG. 12B). In the individual insert image illustrated in FIG. 12B, the close-up images 50, 51, 52, and 53 of the manipulated characters A, B, C, and D of the four cooperating players are arranged in a ring shape, and the close-up image 51 of the manipulated character B of the second player is arranged at a center of the ring. This insert image (FIG. 12B) is transmitted toward the terminal apparatus 20B and inserted to the game screen 40 of the terminal apparatus 20B.

It should be noted that, in FIG. 12B, a frame of the close-up image 51 may be set to a different color from frames of the other close-up images 50, 52, and 53. In addition, in FIG. 12B, a size of the close-up image 51 may be set larger than the other close-up images 50, 52, and 53. Furthermore, in FIG. 12B, the close-up image 51 may be displayed as an animation. Moreover, a conversation voice (a dialogue) of the manipulated character B may be output while the insert image illustrated in FIG. 12B is being displayed.

Figure 12C:
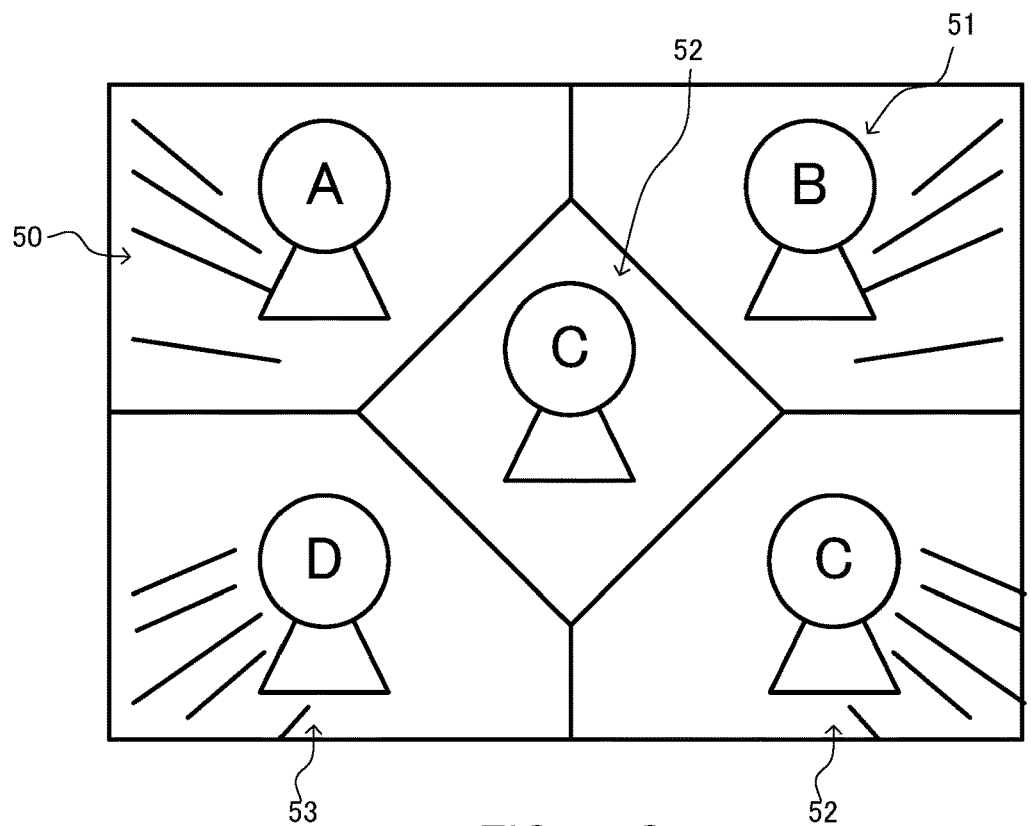
FIG. 12C is a diagram illustrating an example of an individual insert image generated in accordance with a manipulated character C in an embodiment of the invention.

When one of the two or more cooperating players is the third player, the insert image generating unit 103-11 generates an individual insert image directed at the third player in accordance with the manipulated character C manipulated by the third player (FIG. 12C). In the individual insert image illustrated in FIG. 12C, the close-up images 50, 51, 52, and 53 of the manipulated characters A, B, C, and D of the four cooperating players are arranged in a ring shape, and the close-up image 52 of the manipulated character C of the third player is arranged at a center of the ring. This insert image (FIG. 12C) is transmitted toward the terminal apparatus 20C and inserted to the game screen 40 of the terminal apparatus 20C.

It should be noted that, in FIG. 12C, a frame of the close-up image 52 may be set to a different color from frames of the other close-up images 50, 51, and 53. In addition, in FIG. 12C, a size of the close-up image 52 may be set larger than the other close-up images 50, 51, and 53. Furthermore, in FIG. 12C, the close-up image 52 may be displayed as an animation. Moreover, a conversation voice (a dialogue) of the manipulated character C may be output while the insert image illustrated in FIG. 12C is being displayed.

Figure 12D:
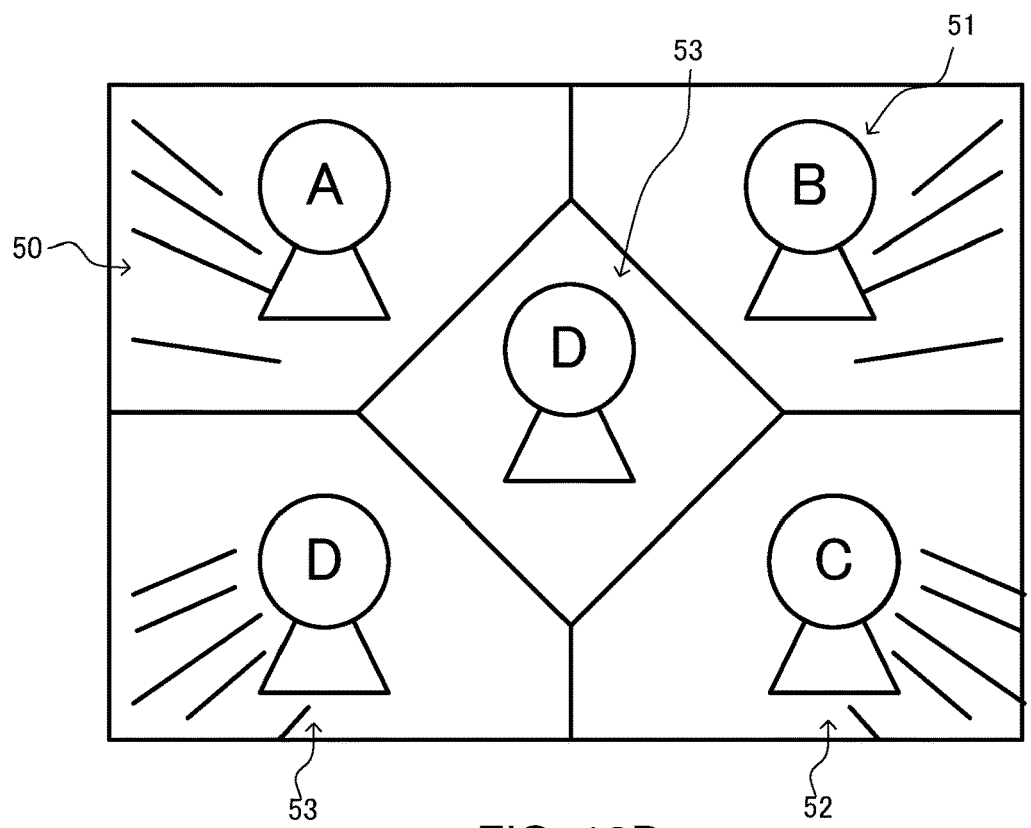
FIG. 12D is a diagram illustrating an example of an individual insert image generated in accordance with a manipulated character D in an embodiment of the invention.

When one of the two or more cooperating players is the fourth player, the insert image generating unit 103-11 generates an individual insert image directed at the fourth player in accordance with the manipulated character D manipulated by the fourth player (FIG. 12D). In the individual insert image illustrated in FIG. 12D, the close-up images 50, 51, 52, and 53 of the manipulated characters A, B, C, and D of the four cooperating players are arranged in a ring shape, and the close-up image 53 of the manipulated character D of the fourth player is arranged at a center of the ring. This insert image (FIG. 12D) is transmitted toward the terminal apparatus 20D and inserted to the game screen 40 of the terminal apparatus 20D.

It should be noted that, in FIG. 12D, a frame of the close-up image 53 may be set to a different color from frames of the other close-up images 50, 51, and 52. In addition, in FIG. 12D, a size of the close-up image 53 may be set larger than the other close-up images 50, 51, and 52. Furthermore, in FIG. 12D, the close-up image 53 may be displayed as an animation. Moreover, a conversation voice (a dialogue) of the manipulated character D may be output while the insert image illustrated in FIG. 12D is being displayed.

Figure 13A:
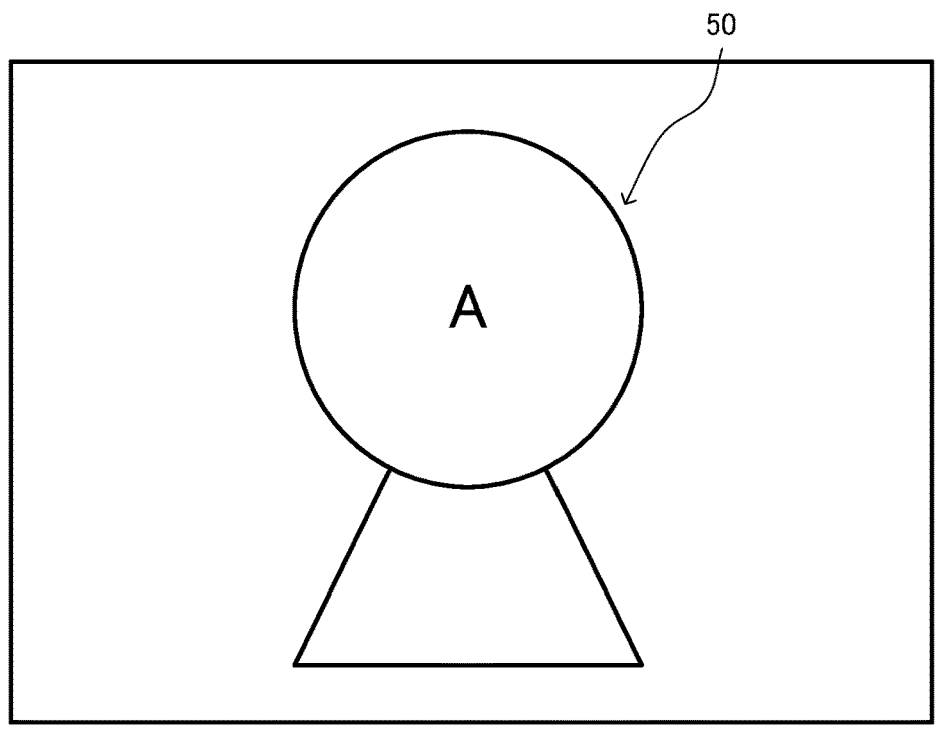
FIG. 13A is a diagram illustrating another example of an individual insert image generated in accordance with the manipulated character A in an embodiment of the invention.

It should be noted that the insert image generating unit 103-11 may use, as the individual insert image directed at the first player, an individual insert image illustrated in FIG. 13A in place of the individual insert image illustrated in FIG. 12A. The individual insert image illustrated in FIG. 13A is a solo close-up image of the manipulated character A.

Figure 13B:
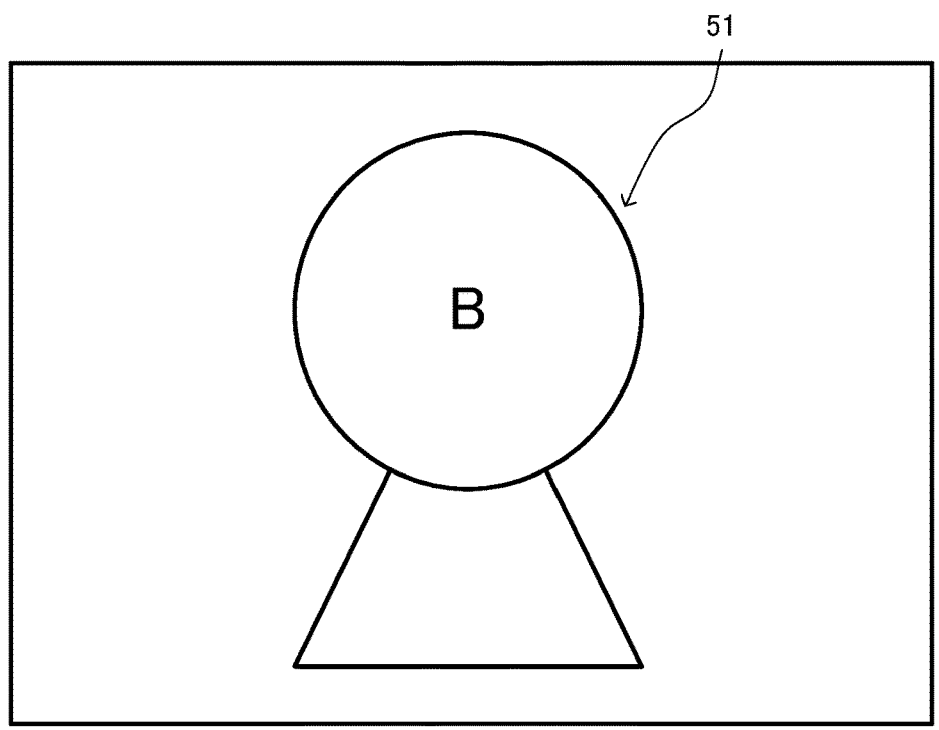
FIG. 13B is a diagram illustrating another example of an individual insert image generated in accordance with the manipulated character B in an embodiment of the invention.

In addition, the insert image generating unit 103-11 may use, as the individual insert image directed at the second player, an individual insert image illustrated in FIG. 13B in place of the individual insert image illustrated in FIG. 12B. The individual insert image illustrated in FIG. 13B is a solo close-up image of the manipulated character B.

Figure 13C:
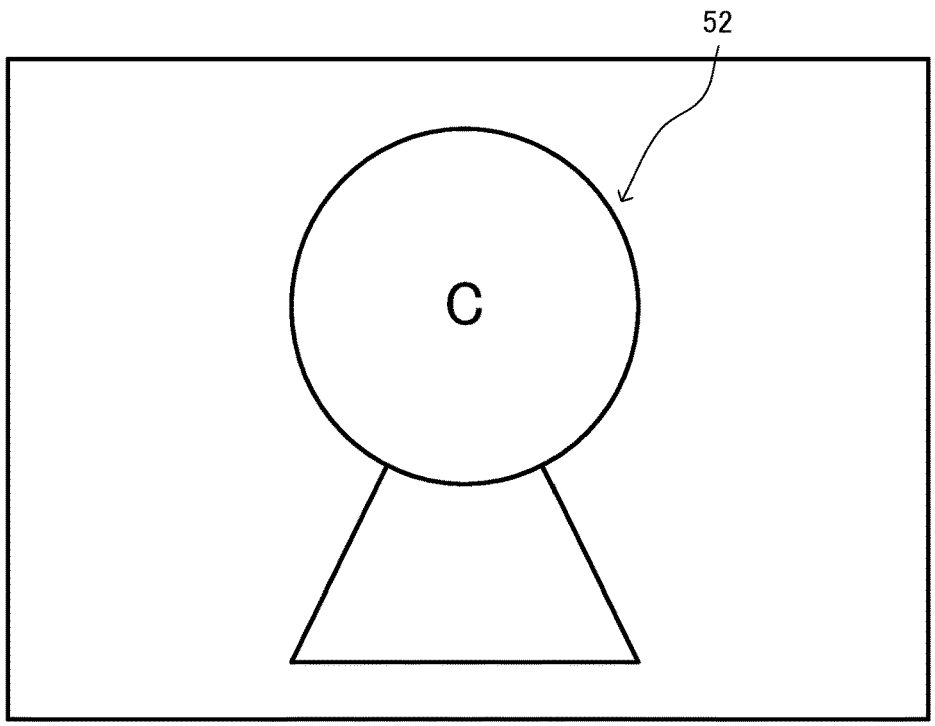
FIG. 13C is a diagram illustrating another example of an individual insert image generated in accordance with the manipulated character C in an embodiment of the invention.

Furthermore, the insert image generating unit 103-11 may use, as the individual insert image directed at the third player, an individual insert image illustrated in FIG. 13C in place of the individual insert image illustrated in FIG. 12C. The individual insert image illustrated in FIG. 13C is a solo close-up image of the manipulated character C.

Figure 13D:
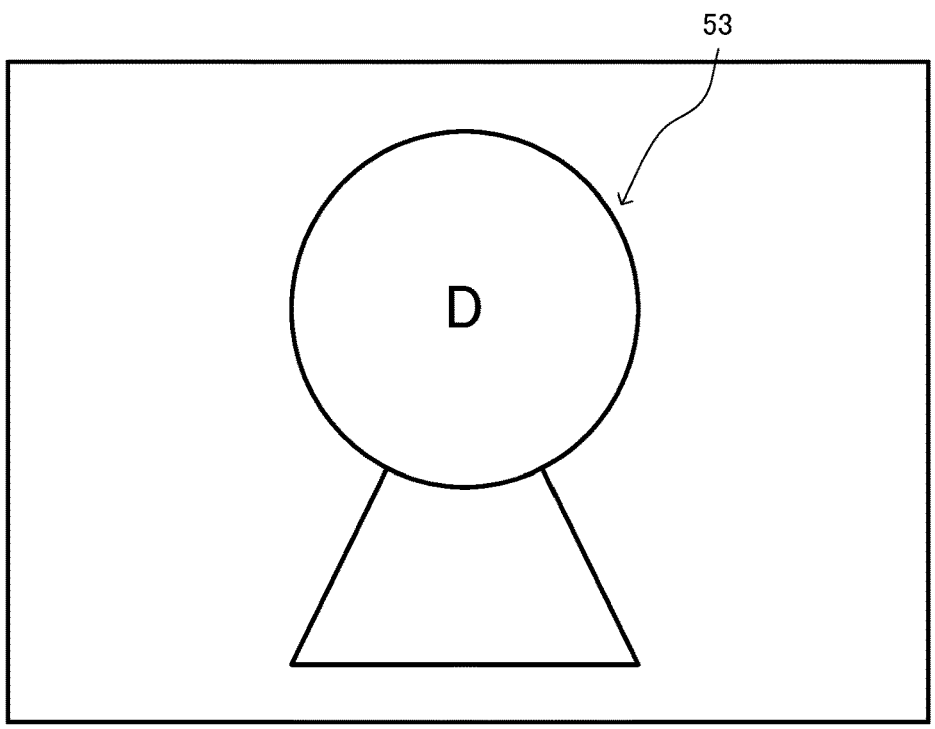
FIG. 13D is a diagram illustrating another example of an individual insert image generated in accordance with the manipulated character D in an embodiment of the invention.

Moreover, the insert image generating unit 103-11 may use, as the individual insert image directed at the fourth player, an individual insert image illustrated in FIG. 13D in place of the individual insert image illustrated in FIG. 12D. The individual insert image illustrated in FIG. 13D is a solo close-up image of the manipulated character D.

According to the present embodiment described above, when the 4-hit combo condition is fulfilled with respect to manipulation commands, an image related to manipulated characters (in this case, the manipulated characters A, B, C, and D) of two or more cooperating players (in this case, four players) having cooperated with the fulfillment is inserted into the game screen 40 of at least the two or more cooperating players. In addition, an insert image directed at each of the two or more cooperating players (in this case, four players) is individually generated in accordance with each of the manipulated characters (in this case, the manipulated characters A, B, C, and D) (FIGS. 12A to 12D and FIGS. 13A to 13D). Therefore, the cooperating players (in this case, four players) having cooperated with the fulfillment of the 4-hit combo condition are provided with an insert image directed at himself/herself (an insert image exclusive for himself/herself or an insert image centered on himself/herself) as a reward for the cooperation. As a result, according to the present embodiment, since a certain sense of specialness can be bestowed to a cooperating player, cooperation among individual players can be promoted and a game involving cooperative play can be energized.

It should be noted that while a still image (FIGS. 8 to 11 and FIGS. 12A to 12D) inserted to a partial area of the game screen 40 or a still image (FIGS. 13A to 13D) inserted by suspending the game screen 40 has been described above as the "insert image", the insert image may be a moving image inserted by temporarily suspending display of the game screen 40, a still image inserted in a partial area of the game screen, a moving image inserted in a partial area of the game screen, etc.

In addition, while a screen of the display unit (a built-in display) provided in the terminal apparatus 20 is assumed as the "screen", the screen may be a screen of a display apparatus (an external display) that can be connected to the terminal apparatus 20.

4.11. Another Example of Individual Insert Image

In the present embodiment, when an image in which related images (in this case, the close-up images 50, 51, 52, and 53) of manipulated characters of two or more cooperating players are arranged in a screen is adopted as the insert image (for example, FIG. 11), the insert image generating unit 103-11 may generate an individual insert image (generate an insert image for each cooperating player) by adjusting a relationship of at least one of a layout, a display color, and a display size between the close-up images.

For example, the insert image generating unit 103-11 may generate an insert image directed at each of the two or more cooperating players so that the close-up image of each manipulated character is arranged at a predetermined position (such as head, center, or tail).

Alternatively, the insert image generating unit 103-11 may generate an insert image directed at each of the two or more cooperating players so that a display color of the close-up image of each manipulated character is more eye-catching than a display color of the other close-up images. It should be noted that the "display color" may include at least one of brightness, saturation, and hue.

Alternatively, the insert image generating unit 103-11 may generate an insert image directed at each of the two or more cooperating players so that a display size of the close-up image of each manipulated character is larger than a display size of the other close-up images.

4.12. Another Example of Individual Insert Image

In the present embodiment, when an image in which close-up images of manipulated characters of two or more cooperating players are arranged in a time series (a moving image) is adopted as the insert image, the insert image generating unit 103-11 may generate an individual insert image by adjusting a relationship of at least one of a display order, a display color, a display size, and a display time between the close-up images in the moving image.

For example, the insert image generating unit 103-11 may generate an insert image (a moving image) directed at each of the two or more cooperating players so that the close-up image of each manipulated character is arranged in a predetermined order (such as start, middle, or end).

Alternatively, the insert image generating unit 103-11 may generate an insert image (a moving image) directed at each of the two or more cooperating players so that a display color of the close-up image of each manipulated character is more eye-catching than a display color of the other close-up images.

Alternatively, the insert image generating unit 103-11 may generate an insert image (a moving image) directed at each of the two or more cooperating players so that a display size of the close-up image of each manipulated character is larger than a display size of the other close-up images.

Alternatively, the insert image generating unit 103-11 may generate an insert image (a moving image) directed at each of the two or more cooperating players so that a display time of the close-up image of each manipulated character is longer than a display time of the other close-up images.

4.13. Combo Conditions

In the present embodiment, the 4-hit combo condition described earlier may include a condition that input of a series of manipulation commands is completed within a time limit. Specifically, the 4-hit combo condition described earlier is a condition that "a manipulation command related to a deadly strike is input within a time limit after the 3-hit combo condition is fulfilled", the 3-hit combo condition is a condition that "a manipulation command related to a deadly strike is input within a time limit after the 2-hit combo condition is fulfilled", and the 2-hit combo condition is a condition that "a manipulation command related to a deadly strike is input within a time limit after a manipulation command related to a deadly strike is input".

Therefore, in the present embodiment, since a time requirement is imposed to the fulfillment of the 4-hit combo condition, a sense of urgency can be imparted to a player about to cooperate with fulfilling the 4-hit combo condition.

4.14. Preparation of Close-up Image

In the present embodiment, the insert image generating unit 103-11 may generate an individual insert image based on a close-up image selected from four close-up images (FIGS. 13A, 13B, 13C, and 13D) prepared in advance with respect to each of the four manipulated characters A, B, C, and D.

For example, data of the four close-up images is stored in advance in the game information 144 in the storage unit 140 and read when appropriate by the insert image generating unit 103-11. In this case, since processing for generating the close-up image of the manipulated character A (FIG. 13A), the close-up image of the manipulated character B (FIG. 13B), the close-up image of the manipulated character C (FIG. 13C), and the close-up image of the manipulated character D (FIG. 13D) need not be performed, processing for generating individual insert images can be made more efficient.

4.15. Preparation of Insert Image

In the present embodiment, the insert image generating unit 103-11 may use an insert image selected from a plurality of insert images (for example, FIGS. 12A, 12B, 12C, and 12D) prepared in advance with respect to each of the four manipulated characters A, B, C, and D to generate an individual insert image. In this case, since processing for generating the individual insert images (FIGS. 13A, 13B, 13C, and 13D) need not be performed, processing for generating individual insert images can be made even more efficient.

4.16. Example of Method of Generating Individual Insert Image

In the present embodiment, the insert image generating unit 103-11 may generate individual insert images (for example, FIGS. 12A, 12B, 12C, and 12D) by replacing a partial area of an insert image (for example, FIG. 11) with another image (a close-up image of a manipulated character). In this case, since other parts of the insert image can be shared among two or more cooperating players, processing for generating an individual insert image can be made more efficient.

Moreover, when a moving image is generated as an insert image, the insert image generating unit 103-11 may generate individual insert images by replacing a partial period of the moving image with another moving image or a still image (a close-up image of a manipulated character).

4.17. Another Example of Method of Generating Individual Insert Image

In the present embodiment, the insert image generating unit 103-11 may generate individual insert images by adding other images (for example, FIGS. 13A, 13B, 13C, and 13D) to an insert image (for example, FIG. 11). In this case, since a part of the insert image can be shared among two or more cooperating players, processing for generating an individual insert image can be made more efficient.

Moreover, when a moving image is generated as an insert image, the insert image generating unit 103-11 may generate individual insert images by adding another moving image or a still image (a close-up image of a manipulated character) to the moving image.

4.18. Presentation of Insert Image

In the present embodiment, the insert image generating unit 103-11 may further control presentation of an individually generated insert image in accordance with at least one of a game status and a relationship of two or more cooperating players.

For example, when the two or more cooperating players are the first player and the second player, the insert image generating unit 103-11 determines whether or not the first player and the second player are in a friendship based on information related to friend registrations of the first player and the second player in the user information 146. In addition, the insert image generating unit 103-11 emphasizes presentation of an insert image in a case where the first player and the second player are in a friendship more than a case where presentation of an insert image when the first player and the second player are not in a friendship.

For example, the insert image generating unit 103-11 calculates a collective level (for example, an average level) of the first player and the second player based on information related to levels of the first player and the second player in the user information 146. In addition, the insert image generating unit 103-11 emphasizes the presentation of the insert image such that the higher the collective level, the greater the emphasis.

According to the present embodiment, since the presentation of an insert image changes in accordance with at least one of a game status and a relationship (a presence or absence of friendship or the like) of two or more cooperating players, each cooperating player can get involved in the presentation of the insert image by changing at least one of a game status and a relationship with another cooperating player.

In this case, as the "game status", besides a collective parameter calculated from respective parameters of the two or more cooperating players, a parameter of a team to which the two or more cooperating players belong can be used. In addition, besides a level, a stamina level or the like can be used as a parameter type.

Furthermore, "presentation" may include a presence or absence of a visual effect, a presence or absence of slow motion, and an extension or a reduction of display time of a partial image. Moreover, emphasizing presentation can be performed by, for example, making a visual effect more eye-catching, making a slow speed even slower, and setting a display time of a partial image longer.

5. Timing Chart

Figure 14:
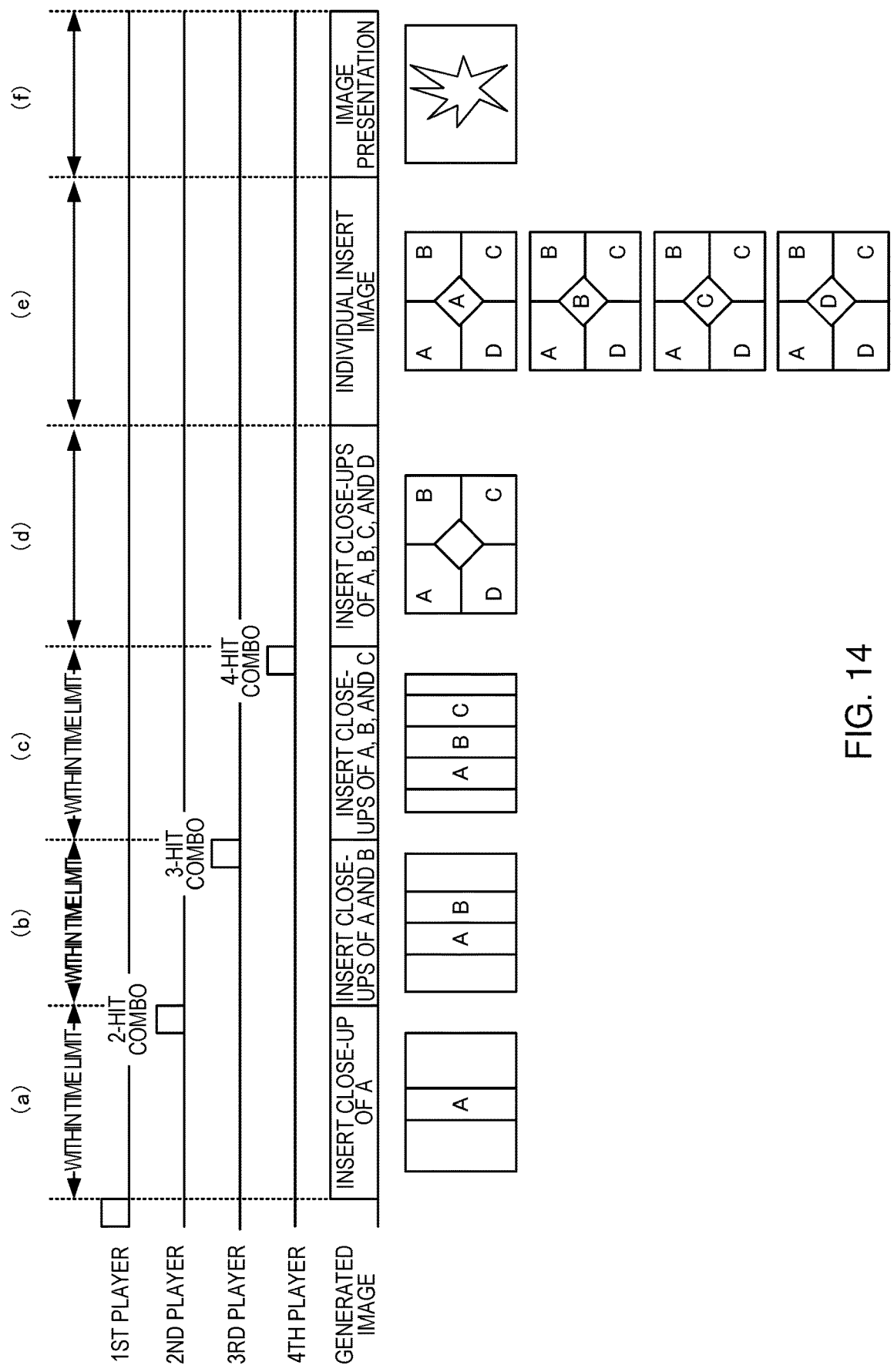
FIG. 14 is a timing chart illustrating an example of a relationship between an input timing of a manipulation command and a display period of an insert image in an embodiment of the invention.

FIG. 14 is a timing chart illustrating an example of a relationship between an input timing of a manipulation command and a display period of an insert image. It should be noted that the illustrations illustrated in a lower part of FIG. 14 represent simplified screen layouts.

The example illustrated in FIG. 14 represents a case where the first player inputs a manipulation command, the second player inputs a manipulation command within a time limit from the input timing of the manipulation command input by the first player, the third player inputs a manipulation command within a time limit from the input timing of the manipulation command input by the second player, and the fourth player inputs a manipulation command within a time limit from the input timing of the manipulation command input by the third player, thereby fulfilling the 4-hit combo condition. Each of blocks of a first stage, a second stage, a third stage, and a fourth stage in FIG. 14 indicates an input timing of a manipulation command by each player.

In this case, during a period after the first player inputs the manipulation command and before the second player inputs the manipulation command, a close-up image of the manipulated character A of the first player is inserted into the game screen (FIG. 14A).

In addition, during a period after the second player inputs the manipulation command and before the third player inputs the manipulation command, close-up images of the manipulated character A of the first player and the manipulated character B of the second player are inserted into the game screen (FIG. 14B).

Furthermore, during a period after the third player inputs the manipulation command and before the fourth player inputs the manipulation command, close-up images of the manipulated character A of the first player, the manipulated character B of the second player, and the manipulated character C of the third player are inserted into the game screen (FIG. 14C).

In addition, for a certain period after the fourth player inputs the manipulation command, close-up images of the manipulated character A of the first player, the manipulated character B of the second player, the manipulated character C of the third player, and the manipulated character D of the fourth player are inserted into the game screen (FIG. 14D).

Subsequently, for a certain period, an individual insert image is inserted into the game screen of each player (FIG. 14E), the insertion is then canceled, and after a presentation image of a combo attack is displayed (FIG. 14F), a return is made to the normal game screen.

Moreover, the game image generating unit 103-1 may provide a period in which the screen is dimmed between the period (d) and the period (e). Such a screen presentation is a known method that is employed in order to further emphasize an image displayed after a blackout.

In addition, the game image generating unit 103-1 may provide a period in which the screen is dimmed between the period (e) and the period (f). "Blackout" as used herein refers to temporarily dimming an entire area of the screen. Such a screen presentation is a known method that is employed in order to further emphasize an image displayed after a blackout.

6. Flow Chart

Figure 15:
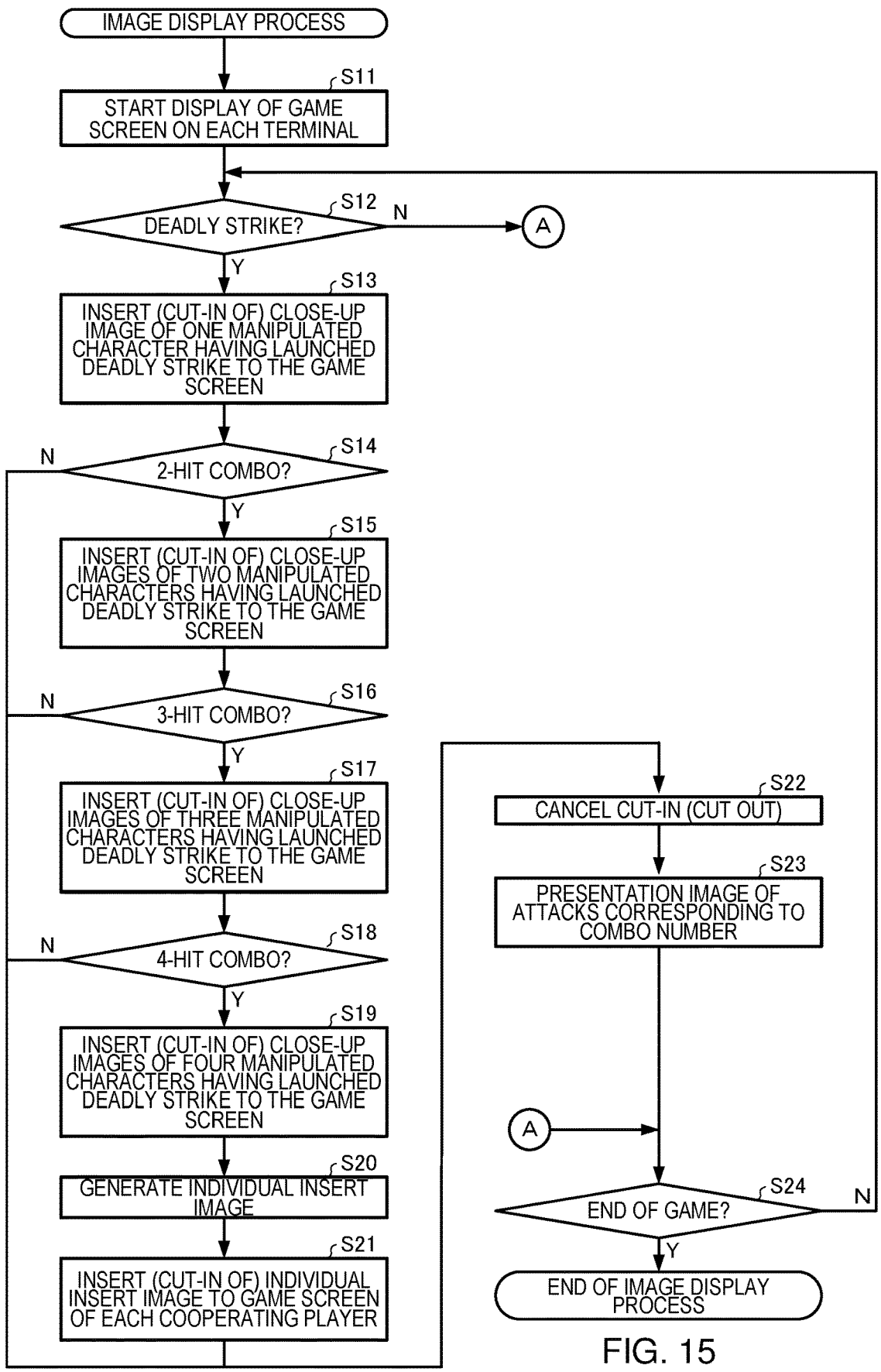
FIG. 15 is a flow chart of an example of an image displaying process according to an embodiment of the invention.

FIG. 15 is a diagram for explaining a flow of processing (an image displaying process) related to image display in a match-up game. The processing is executed by the processing unit 100 of the server apparatus 10 after the start of the match-up game. Since the allotment of functions in the processing unit 100 has already been described, the following description assumes that an executing entity of the processing is the "processing unit 100". In addition, descriptions of processing not directly related to image display will be omitted below.

First, the processing unit 100 starts display of a game screen (for example, FIG. 6) on the terminal apparatuses 20A, 20B, 20C, and 20D (S11).

Figure 7:
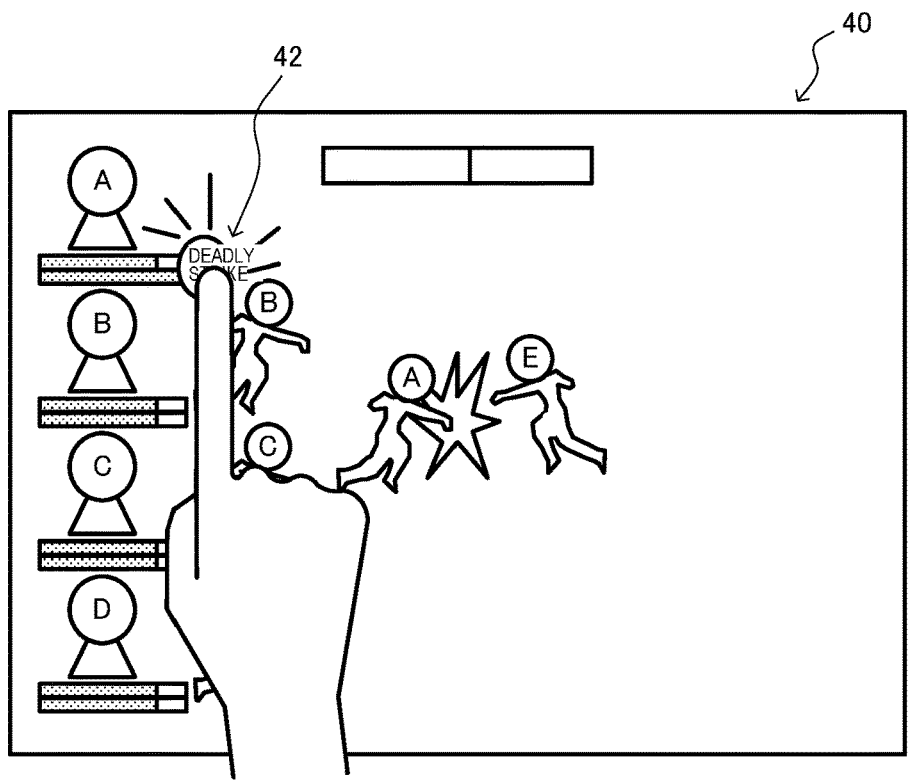
FIG. 7 illustrates an example of manipulation by a player performed on a game screen according to an embodiment of the invention.

Next, the processing unit 100 determines whether or not a manipulation command related to a deadly strike is input (for example, whether or not a deadly strike button is tapped as illustrated in FIG. 7) (S12), and when the manipulation command is input (S12Y), a transition is made to a cut-in process (S13), but when the manipulation command is not input (S12N), a transition is made to an end determination process (S24).

Next, the processing unit 100 generates a close-up image of the manipulated character having launched the deadly strike (a manipulated object of the player having input the manipulation command) as an insert image (for example, symbol 50 in FIG. 8), and inserts (a cut-in of) the insert image to the game screen of each of the terminal apparatuses 20A, 20B, 20C, and 20D (S13) (for example, FIG. 8).

Next, the processing unit 100 determines whether or not a next manipulation command is input within a time limit (whether or not the 2-hit combo condition is fulfilled) (S14), and when fulfilled (S14Y), a transition is made to a cut-in process (S15), but when the 2-hit combo condition is not fulfilled within a time limit (S14N), a transition is made to processing after a cut-in (S22).

Next, the processing unit 100 generates close-up images of the two manipulated characters having successively launched deadly strikes (manipulated objects of the cooperating players having cooperated with fulfilling the 2-hit combo condition) as insert images (for example, symbols 50 and 51 in FIG. 9), and inserts (a cut-in of) the insert image to the game screen of each of the terminal apparatuses 20A, 20B, 20C, and 20D (S15) (for example, FIG. 9).

Next, the processing unit 100 determines whether or not a next manipulation command is input within a time limit (whether or not the 3-hit combo condition is fulfilled) (S16), and when fulfilled (S16Y), a transition is made to a cut-in process (S17), but when the 3-hit combo condition is not fulfilled within a time limit (S16N), a transition is made to processing after a cut-in (S22).

Next, the processing unit 100 generates close-up images of the three manipulated characters having successively launched deadly strikes (manipulated objects of the cooperating players having cooperated with fulfilling the 3-hit combo condition) as insert images (for example, symbols 50, 51, and 52 in FIG. 10), and inserts (a cut-in of) the insert image to the game screen of each of the terminal apparatuses 20A, 20B, 20C, and 20D (S17) (for example, FIG. 10).

Next, the processing unit 100 determines whether or not a next manipulation command is input within a time limit (whether or not the 4-hit combo condition is fulfilled) (S18), and when fulfilled (S18Y), a transition is made to a cut-in process (S19), but when the 4-hit combo condition is not fulfilled within a time limit (S18N), a transition is made to processing after a cut-in (S22).

Next, the processing unit 100 generates close-up images of the four manipulated characters having successively launched deadly strikes (manipulated objects of the cooperating players having cooperated with fulfilling the 4-hit combo condition) as insert images (for example, symbols 50, 51, 52, and 53 in FIG. 11), and inserts (a cut-in of) the insert image to the game screen of each of the terminal apparatuses 20A, 20B, 20C, and 20D (S19) (for example, FIG. 11).

Next, the processing unit 100 generates individual insert images (for example, FIGS. 12A, 12B, 12C, and 12D) corresponding to the cooperating players having cooperated with fulfilling the 4-hit combo condition (S20).

Next, the processing unit 100 individually inserts (a cut-in of) the individual insert images (for example, FIGS. 12A, 12B, 12C, and 12D) into the game screens of the terminal apparatuses 20A, 20B, 20C, and 20D (S21).

Next, the processing unit 100 cancels (cuts out) the insert images being inserted into the game screen of each of the terminal apparatuses 20A, 20B, 20C, and 20D (S22).

Next, the processing unit 100 causes the image presentation of an attack in accordance with the number of combos to be displayed on the game screen of each of the terminal apparatuses 20A, 20B, 20C, and 20D (S23). It should be noted that, at this timing, parameters of the cooperating players and parameters of the enemy character are updated in accordance with the number of combos. The larger the number of combos, the larger an amount of reduction from (damage to) the stamina level of the enemy character.

Next, the processing unit 100 determines whether or not an end condition of the match-up game is fulfilled (S24), and when fulfilled (S24Y), the flow is ended, but when not fulfilled (S24N), a transition is made to the processing for determining a presence or absence of an input of a manipulation command (S12). Moreover, the end condition is that a predetermined time has elapsed after the start of the match-up game or a stamina level of one of the characters or teams involved in the match-up has dropped to zero.

It should be noted that a part of the flow illustrated in FIG. 15 can be modified insofar as functions of the flow are not impaired. In addition, a part of the steps of the flow illustrated in FIG. 15 can be omitted.

7. Operational Effect

According to the embodiments described above, when a 4-hit combo condition is fulfilled with respect to a character action involving launching a deadly strike which is generated based on a manipulation command or with respect to the manipulation command, images related to manipulated characters of two or more cooperating player having cooperated with the fulfillment is inserted into a game screen of at least the two or more cooperating players. In addition, the insert image directed at each of the two or more cooperating players is individually generated in accordance with each manipulated character. Therefore, a cooperating player having cooperated with the fulfillment of conditions is provided with an insert image directed at himself/herself (an insert image exclusive for himself/herself or an insert image centered on himself/herself) as a reward for the cooperation. As a result, according to the embodiments described above, since a certain sense of specialness can be bestowed to a cooperating player, cooperation among individual players can be promoted and a game involving cooperative play can be energized.

8. Supplement

8.1. Method of Generating Moving Image

In the game system 1 according to the embodiments described above, an individual insert image to be provided to two or more cooperating players may be generated by the server apparatus 10 in accordance with a request from the terminal apparatuses 20 used by the cooperating players and transmitted to the terminal apparatuses 20 (generating of streaming moving image).

8.2. Insert Image According to Billing

In addition, the insert image generating unit 103-11 according to the embodiments described above may increase a partial size (or time) of an insert image (a cut-in presentation) directed at a player on the condition that the player is billed. For example, the insert image generating unit 103-11 may set the display size (or a display time) of an insert image of a manipulated character of a player such that the larger the billed amount of the player, the larger the display size (or the longer the display time).

8.3. Insert Image According to Level

Furthermore, when there is a difference in levels between players (or between manipulated characters) in the ally team, the insert image generating unit 103-11 may set an arrangement (order) of manipulated characters in an insert image in accordance with the levels of the manipulated characters. For example, the insert image generating unit 103-11 may generate an insert image such that the higher a relative level of a manipulated character, the closer the manipulated character is arranged to center of the insert image.

8.4 Insert Image Based on Item

In addition, the insert image generating unit 103-11 may increase a partial size (or time) of an insert image (a cut-in presentation) directed at a player on the condition that a given item is consumed by the player. For example, the insert image generating unit 103-11 may set a larger display size (or a longer display time) of an insert image of a manipulated character of a player on the condition that a first item is consumed by the player, and set a display position of the insert image of the manipulated character of the player at center on the condition that a second item is consumed by the player.

8.5. Progress of Game

In addition, while not particularly mentioned in the embodiments described above, the game managing unit 103 may stop the progress of a match-up game during a period in which an insert image is being inserted into a game screen (during an occurrence of a cut-in). To this end, for example, the game managing unit 103 may inhibit acceptance of manipulation commands other than a manipulation command related to a deadly strike during the occurrence of a cut-in.

9. Other

The invention is not limited to the embodiments described above and various modifications can be made thereto. For example, any term cited with a different term having a broader meaning or the same meaning in the specification and the drawings may be replaced by the different term in any place in the specification and the drawings.

In addition, in the embodiments described above, terminal apparatuses 20 may be provided with each game by a single server apparatus 10 or a plurality of server apparatuses 10 may operate in conjunction with one another to construct a server system to provide the terminal apparatuses 20 with each game. In other words, a part of or all of the functions of the server apparatus 10 may be mounted to the terminal apparatuses 20. Furthermore, the allotment of functions of the processing unit 100 of the server apparatus 10 is similarly not limited to the allotment of functions described above.

The invention is not limited to the above-described embodiments, and various modifications can be made. For example, the invention includes various other configurations that are substantially identical to the configurations described in the embodiments (for example, configurations having identical functions, methods, and results or configurations having identical objectives and effects). The invention also includes various other configurations in which non-essential elements described in the embodiments are replaced by other elements. The invention also includes various other configurations having the same effects as those of the configurations described in the embodiments, or various other configurations capable of achieving the same objectives as those of the configurations described in the embodiments. Furthermore, the invention includes various other configurations in which known techniques are added to the configurations described in the embodiments.

Some embodiments of the invention have been described in detail above, but a person skilled in the art will readily appreciate that various modifications can be made from the embodiments without materially departing from the novel teachings and effects of the invention. Accordingly, all such modifications are assumed to be included in the scope of the invention.

What is claimed is:

1. An image generation system which provides, to a plurality of players through terminals individually used by the plurality of players, an image of a game which progresses through cooperation of a plurality of manipulated characters individually manipulated by the plurality of players, the image generation system comprising:

at least one processor programmed to:

generate an image of a game space in which the plurality of manipulated characters act, on game screens directed at the plurality of players;

determine whether or not a first condition of input of manipulation information of a second player being provided within a time limit from a time point of reception of manipulation information of a first player is fulfilled;

when the first condition is fulfilled, generate a first insert image related to the manipulated character of the first player and a second insert image related to the manipulated character of the second player by adjusting a relationship of at least one of a layout and a display size between the first insert image and the second insert image, the first insert image and the second insert image being inserted into a game screen of the first player and a game screen of the second player; and determine whether or not a second condition of an input of manipulation information of a third player being provided within a time limit from a time point of reception of manipulation information of the second player is fulfilled, wherein:

the first insert image and the second insert image are inserted into a game screen of the first player, a game screen of the second player, and a game screen of the third player before determining the second condition.

2. The image generation system according to claim 1, wherein the first insert image and the second insert image are arranged in a time series, and wherein the processor generates the first insert image and the second insert image by adjusting a relationship of at least one of a display order, a display color, a display size, and a display time between the first insert image and the second insert image.

3. The image generation system according to claim 1, wherein the processor is further programmed to:

generate the first insert image based on an image previously prepared for the manipulated character of the first player, and generate the second insert image based on an image previously prepared for the manipulated character of the second player.

4. The image generation system according to claim 1, wherein the processor is further programmed to generate the first insert image by replacing a partial area of a previously-generated image with another image related to the manipulated character of the first player, and generate the second insert image by replacing a partial area of the previously-generated image with another image related to the manipulated character of the first player.

5. The image generation system according to claim 1, wherein the processor is further programmed to:

generate the first insert image by adding another image related to the manipulated character of the first player to a previously-generated image, and generate the second insert image by adding another image related to the manipulated character of the second player to the previously-generated image.

6. The image generation system according to claim 1, wherein the processor controls presentation of the first insert image and the second insert image in accordance with at least one of a game status and a relationship of the first player and the second player.

7. An image generation system which provides, to a plurality of players through terminals individually used by the plurality of players, an image of a game which progresses through cooperation of a plurality of manipulated characters individually manipulated by the plurality of players, the image generation system comprising:

at least one processor programmed to:

generate an image of a game space in which the plurality of manipulated characters act, as a game screen directed at the plurality of players;

determine whether or not a first condition of input of manipulation information of a second player being provided within a time limit from a time point of reception of manipulation information of a first player is satisfied;

determine whether or not a second condition of input of manipulation information of a third player being provided within a time limit from a time point of reception of manipulation information of the second player is fulfilled; and when the first condition is fulfilled, generating a first insert image related to the manipulated character of the first player and a second insert image related to the manipulated character of the second player, the first insert image and the second insert image being inserted into a game screen of the first player, a game screen of the second player, and a game screen of the third player before determining the second condition.

8. A non-transitory computer-readable information storage medium storing a program of an image generation system which provides, to a plurality of players through terminals individually used by the plurality of players, an image of a game which progresses through cooperation of a plurality of manipulated characters individually manipulated by the plurality of players, the program causing a computer to perform steps comprising:

generating an image of a game space in which the plurality of manipulated characters act, as a game screen directed at the plurality of players;

determining whether or not a first condition of input of manipulation information of a second player being provided within a time limit from a time point of reception of manipulation information of a first player is fulfilled;

when the first condition is fulfilled, generating a first insert image related to the manipulated character of the first player and a second insert image related to the manipulated character of the second player by adjusting a relationship of at least one of a layout and a display size between the first insert image and the second insert image, the first insert image and the second insert image being inserted into a game screen of the first player and a game screen of the second player; and determining whether or not a second condition of an input of manipulation information of a third player being provided within a time limit from a time point of reception of manipulation information of the second player is fulfilled, wherein:
the first insert image and the second insert image are inserted into a game screen of the first player, a game screen of the second player, and a game screen of the third player before determining the second condition.

9. The image generation system according to claim 7, wherein the first insert image and the second insert image are arranged in a time series, and
wherein the processor generates the first insert image and the second insert image by adjusting a relationship of at least one of a display order, a display color, a display size, and a display time between the first insert image and the second insert image.

10. The image generation system according to claim 7, wherein
the processor is further programmed to:
generate the first insert image based on an image previously prepared for the manipulated character of the first player, and
generate the second insert image based on an image previously prepared for the manipulated character of the second player.

11. The image generation system according to claim 7, wherein
the processor is further programmed to
generate the first insert image by replacing a partial area of a previously-generated image with another image related to the manipulated character of the first player, and
generate the second insert image by replacing a partial area of the previously-generated image with another image related to the manipulated character of the first player.

12. The image generation system according to claim 7, wherein
the processor is further programmed to:
generate the first insert image by adding another image related to the manipulated character of the first player to a previously-generated image, and
generate the second insert image by adding another image related to the manipulated character of the second player to the previously-generated image.

13. The image generation system according to claim 7, wherein the processor controls presentation of the first insert image and the second insert image in accordance with at least one of a game status and a relationship of the first player and the second player.

14. A non-transitory computer-readable information storage medium storing a program of an image generation system which provides, to a plurality of players through terminals individually used by the plurality of players, an image of a game which progresses through cooperation of a plurality of manipulated characters individually manipulated by the plurality of players, the program causing a computer to perform steps comprising:
generating an image of a game space in which the plurality of manipulated characters act, as a game screen directed at the plurality of players;
determining whether or not a first condition of input of manipulation information of a second player being provided within a time limit from a time point of reception of manipulation information of a first player is satisfied;
determining whether or not a second condition of input of manipulation information of a third player being provided within a time limit from a time point of reception of manipulation information of the second player is fulfilled; and
when the first condition is fulfilled, generating a first insert image related to the manipulated character of the first player and a second insert image related to the manipulated character of the second player, the first insert image and the second insert image being inserted into a game screen of the first player, a game screen of the second player, and a game screen of the third player before determining the second condition.

* * * * *